United States Patent
Demos

(10) Patent No.: US 9,571,855 B2
(45) Date of Patent: *Feb. 14, 2017

(54) REGION SIZING FOR MACROBLOCKS

(71) Applicant: Dolby Laboratories Licensing Corporation, San Francisco, CA (US)

(72) Inventor: Gary A. Demos, Perris, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/190,097

(22) Filed: Jun. 22, 2016

(65) Prior Publication Data

US 2016/0301949 A1    Oct. 13, 2016

Related U.S. Application Data

(63) Continuation of application No. 14/856,791, filed on Sep. 17, 2015, now Pat. No. 9,386,321, and a
(Continued)

(51) Int. Cl.
*H04N 7/12* (2006.01)
*H04N 19/577* (2014.01)
(Continued)

(52) U.S. Cl.
CPC .......... *H04N 19/577* (2014.11); *H04N 19/114* (2014.11); *H04N 19/117* (2014.11);
(Continued)

(58) Field of Classification Search
CPC .... H04N 19/61; H04N 19/114; H04N 19/117; H04N 19/136; H04N 19/137; H04N 19/147; H04N 19/162; H04N 19/167
See application file for complete search history.

(56) References Cited

U.S. PATENT DOCUMENTS 4,642,678 A    2/1987   Cok
4,654,696 A    3/1987   Dayton et al.
(Continued)

FOREIGN PATENT DOCUMENTS

CA    2127151    3/1995
CN    1179063    4/1998
(Continued)

OTHER PUBLICATIONS

"EPO and IEC agree to cooperate on standards and patents," European Patent Office, Apr. 17, 2013, Retrieved from the Internet: URL:http://www.epo.org/news-issues/news/2013/20130417.html [retrieved on Apr. 22, 2013], 1 page.
(Continued)

*Primary Examiner* — Nhon Diep
(74) *Attorney, Agent, or Firm* — Fish & Richardson P.C.

(57) ABSTRACT

Coding techniques for a video image compression system involve improving an image quality of a sequence of two or more bi-directionally predicted intermediate frames, where each of the frames includes multiple pixels. One method involves determining a brightness value of at least one pixel of each bi-directionally predicted intermediate frame in the sequence as an equal average of brightness values of pixels in non-bidirectionally predicted frames bracketing the sequence of bi-directionally predicted intermediate frames. The brightness values of the pixels in at least one of the non-bidirectionally predicted frames is converted from a non-linear representation.

4 Claims, 15 Drawing Sheets

Related U.S. Application Data continuation of application No. 14/856,691, filed on Sep. 17, 2015, now Pat. No. 9,473,791, said application No. 14/856,791 is a continuation of application No. 14/729,628, filed on Jun. 3, 2015, now Pat. No. 9,247,269, said application No. 14/856,691 is a continuation of application No. 14/729,628, which is a continuation of application No. 14/729,572, filed on Jun. 3, 2015, now Pat. No. 9,232,232, which is a continuation of application No. 14/565,803, filed on Dec. 10, 2014, now Pat. No. 9,083,979, which is a continuation of application No. 14/565,824, filed on Dec. 10, 2014, now Pat. No. 9,078,002, which is a continuation of application No. 13/915,056, filed on Jun. 11, 2013, now Pat. No. 8,942,285, which is a continuation of application No. 13/859,373, filed on Apr. 9, 2013, now Pat. No. 8,767,829, which is a continuation of application No. 13/675,622, filed on Nov. 13, 2012, now Pat. No. 8,503,529, which is a continuation of application No. 12/986,220, filed on Jan. 7, 2011, now Pat. No. 8,401,078, which is a continuation of application No. 12/644,953, filed on Dec. 22, 2009, now Pat. No. 8,477,851, which is a continuation of application No. 12/567,161, filed on Sep. 25, 2009, now Pat. No. 8,050,323, which is a continuation of application No. 11/831,723, filed on Jul. 31, 2007, now Pat. No. 7,894,524, which is a continuation of application No. 10/187,395, filed on Jun. 28, 2002, now Pat. No. 7,266,150, which is a continuation-in-part of application No. 09/904,203, filed on Jul. 11, 2001, now Pat. No. 6,816,552.

(51) Int. Cl.

| | | |
|---|---|---|
| *H04N 19/147* | (2014.01) | |
| *H04N 19/51* | (2014.01) | |
| *H04N 19/513* | (2014.01) | |
| *H04N 19/61* | (2014.01) | |
| *H04N 19/114* | (2014.01) | |
| *H04N 19/117* | (2014.01) | |
| *H04N 19/137* | (2014.01) | |
| *H04N 19/186* | (2014.01) | |
| *H04N 19/162* | (2014.01) | |
| *H04N 19/18* | (2014.01) | |
| *H04N 19/17* | (2014.01) | |
| *H04N 19/48* | (2014.01) | |
| *H04N 19/44* | (2014.01) | |
| *H04N 19/82* | (2014.01) | |
| *H04N 19/433* | (2014.01) | |
| *H04N 19/573* | (2014.01) | |
| *H04N 19/58* | (2014.01) | |
| *H04N 19/176* | (2014.01) | |
| *H04N 19/50* | (2014.01) | |
| *H04N 19/517* | (2014.01) | |
| *H04N 19/52* | (2014.01) | |
| *H04N 19/593* | (2014.01) | |
| *H04N 19/70* | (2014.01) | |
| *H04N 19/182* | (2014.01) | |
| *H04N 19/587* | (2014.01) | |
| *H04N 19/136* | (2014.01) | |
| *H04N 19/187* | (2014.01) | |

(52) U.S. Cl.
CPC ......... *H04N 19/136* (2014.11); *H04N 19/137* (2014.11); *H04N 19/147* (2014.11); *H04N 19/162* (2014.11); *H04N 19/17* (2014.11); *H04N 19/176* (2014.11); *H04N 19/18* (2014.11); *H04N 19/182* (2014.11); *H04N 19/186* (2014.11); *H04N 19/187* (2014.11); *H04N 19/433* (2014.11); *H04N 19/44* (2014.11); *H04N 19/48* (2014.11); *H04N 19/50* (2014.11); *H04N 19/51* (2014.11); *H04N 19/513* (2014.11); *H04N 19/517* (2014.11); *H04N 19/52* (2014.11); *H04N 19/573* (2014.11); *H04N 19/58* (2014.11); *H04N 19/587* (2014.11); *H04N 19/593* (2014.11); *H04N 19/61* (2014.11); *H04N 19/70* (2014.11); *H04N 19/82* (2014.11)

(56) References Cited

U.S. PATENT DOCUMENTS

| | | | |
|---|---|---|---|
| 4,903,317 A | 2/1990 | Wu et al. | |
| 4,982,285 A | 1/1991 | Sugiyama | |
| 4,985,768 A | 1/1991 | Sugiyama | |
| 5,151,784 A | 9/1992 | Lavagetto et al. | |
| 5,231,484 A | 7/1993 | Gonzales et al. | |
| 5,294,974 A | 3/1994 | Naimpally et al. | |
| 5,301,019 A | 4/1994 | Citta | |
| 5,337,086 A * | 8/1994 | Fujinami | H04N 19/517 |
| | | | 375/240.16 |
| 5,374,958 A | 12/1994 | Yanagihara | |
| 5,408,270 A | 4/1995 | Lim | |
| 5,412,430 A | 5/1995 | Nagata | |
| 5,426,463 A | 6/1995 | Reininger et al. | |
| 5,438,374 A | 8/1995 | Yan et al. | |
| 5,442,407 A | 8/1995 | Iu | |
| 5,446,498 A | 8/1995 | Boon | |
| 5,465,119 A | 11/1995 | Demos | |
| 5,467,136 A | 11/1995 | Odaka et al. | |
| 5,475,435 A | 12/1995 | Yonemitsu et al. | |
| 5,659,363 A | 8/1997 | Wilkinson | |
| 5,661,524 A | 8/1997 | Murdock et al. | |
| 5,661,525 A | 8/1997 | Kovacevic et al. | |
| 5,668,600 A | 9/1997 | Lee | |
| 5,694,171 A | 12/1997 | Katto | |
| 5,737,032 A | 4/1998 | Stenzel et al. | |
| 5,742,343 A | 4/1998 | Haskell et al. | |
| 5,745,183 A | 4/1998 | Lam | |
| 5,748,903 A | 5/1998 | Agarwal | |
| 5,786,860 A | 7/1998 | Kim et al. | |
| 5,796,438 A | 8/1998 | Hosono | |
| 5,812,194 A | 9/1998 | Wilkinson | |
| 5,815,646 A | 9/1998 | Purcell et al. | |
| 5,825,421 A | 10/1998 | Tan | |
| 5,825,680 A | 10/1998 | Wheeler et al. | |
| 5,835,498 A | 11/1998 | Kim et al. | |
| 5,852,565 A | 12/1998 | Demos | |
| 5,862,261 A | 1/1999 | Lee | |
| 5,877,754 A | 3/1999 | Keith et al. | |
| 5,896,176 A * | 4/1999 | Das | H04N 19/563 |
| | | | 375/240.15 |
| 5,909,224 A | 6/1999 | Fung | |
| 5,920,353 A | 7/1999 | Diaz et al. | |
| 5,926,225 A | 7/1999 | Fukuhara et al. | |
| 5,963,257 A | 10/1999 | Katata et al. | |
| 5,974,184 A | 10/1999 | Eifrig et al. | |
| 5,987,179 A | 11/1999 | Rick et al. | |
| 5,988,863 A | 11/1999 | Demos | |
| 5,991,447 A | 11/1999 | Eifrig et al. | |
| 5,995,095 A | 11/1999 | Ratakonda | |
| 6,005,626 A | 12/1999 | Ding | |
| 6,020,934 A | 2/2000 | Greenfield et al. | |
| 6,023,301 A | 2/2000 | Katata et al. | |
| 6,023,553 A | 2/2000 | Boyce et al. | |
| 6,043,846 A | 3/2000 | Shen et al. | |
| 6,058,143 A | 5/2000 | Golin | |
| 6,069,914 A | 5/2000 | Cox | |
| 6,088,047 A * | 7/2000 | Bose | H04N 19/51 |
| | | | 345/531 |
| 6,097,842 A | 8/2000 | Suzuki et al. | |
| 6,115,421 A | 9/2000 | Katta et al. | |

(56) References Cited

U.S. PATENT DOCUMENTS

| | | |
|---|---|---|
| 6,118,817 A | 9/2000 | Wang |
| 6,163,574 A | 12/2000 | Yagasaki |
| 6,172,768 B1 | 1/2001 | Yamada et al. |
| 6,215,824 B1 | 4/2001 | Assuncao |
| 6,236,727 B1 | 5/2001 | Ciacelli et al. |
| RE37,222 E | 6/2001 | Yonemitsu et al. |
| 6,268,886 B1 | 7/2001 | Choi |
| 6,301,304 B1 | 10/2001 | Jing et al. |
| 6,327,602 B1 | 12/2001 | Kim |
| 6,332,194 B1 | 12/2001 | Bloom et al. |
| 6,404,813 B1 | 6/2002 | Haskell et al. |
| 6,418,405 B1 | 7/2002 | Satyamurti et al. |
| 6,430,222 B1 | 8/2002 | Okada |
| 6,430,316 B1 | 8/2002 | Wilkinson |
| 6,434,196 B1 | 8/2002 | Sethuraman et al. |
| 6,442,203 B1 | 8/2002 | Demos |
| 6,507,615 B1 | 1/2003 | Tsujii et al. |
| 6,539,056 B1 | 3/2003 | Sato et al. |
| 6,629,104 B1 | 9/2003 | Parulski et al. |
| 6,650,708 B1 | 11/2003 | Ohgose |
| 6,654,417 B1 | 11/2003 | Hui |
| 6,654,420 B1 | 11/2003 | Snook |
| 6,658,056 B1 | 12/2003 | Duruoz |
| 6,728,317 B1 | 4/2004 | Demos |
| 6,765,964 B1 | 7/2004 | Conklin |
| 6,807,231 B1 | 10/2004 | Wiegand et al. |
| 6,816,552 B2 | 11/2004 | Demos |
| 6,823,087 B1 | 11/2004 | Liu et al. |
| 6,900,846 B2 | 5/2005 | Lee et al. |
| 6,909,748 B2 | 6/2005 | Dinerstein |
| 6,925,126 B2 | 8/2005 | Lan et al. |
| 6,931,061 B2 | 8/2005 | Youn et al. |
| 6,957,350 B1 | 10/2005 | Demos |
| 7,154,952 B2 | 12/2006 | Tourapis et al. |
| 7,164,717 B2 | 1/2007 | Katsavounidis et al. |
| 7,266,149 B2 | 9/2007 | Holcomb et al. |
| 7,266,150 B2 | 9/2007 | Demos |
| 7,295,612 B2 | 11/2007 | Haskell et al. |
| 7,545,863 B1 | 6/2009 | Haskell et al. |
| 7,606,312 B2 | 10/2009 | Conklin |
| 7,609,763 B2 | 10/2009 | Mukerjee et al. |
| 7,681,013 B1 | 3/2010 | Trivedi et al. |
| 7,733,960 B2 | 6/2010 | Kondo et al. |
| 7,894,524 B2 | 2/2011 | Demos |
| 7,961,965 B2 | 6/2011 | Moreira |
| 8,050,323 B2 | 11/2011 | Demos |
| 8,111,754 B1 | 2/2012 | Demos |
| 8,139,638 B2 | 3/2012 | Demos |
| 8,139,639 B2 | 3/2012 | Demos |
| 8,139,640 B2 | 3/2012 | Demos |
| 8,139,641 B2 | 3/2012 | Demos |
| 8,144,774 B2 | 3/2012 | Demos |
| 8,149,912 B2 | 4/2012 | Demos |
| 8,149,916 B2 | 4/2012 | Ghanbari |
| 8,160,142 B2 | 4/2012 | Demos |
| 8,213,507 B2 | 7/2012 | Demos |
| 8,249,158 B2 | 8/2012 | Demos |
| 8,279,929 B2 | 10/2012 | Demos |
| 8,290,043 B2 | 10/2012 | Demos |
| 8,325,809 B2 | 12/2012 | Demos |
| 8,379,720 B2 | 2/2013 | Demos |
| 8,401,078 B2 | 3/2013 | Demos |
| 8,477,851 B2 | 7/2013 | Demos |
| 8,488,674 B2 | 7/2013 | Demos |
| 8,488,675 B2 | 7/2013 | Demos |
| 8,488,687 B2 | 7/2013 | Fechtel |
| 8,503,529 B2 | 8/2013 | Demos |
| 8,526,496 B2 | 9/2013 | Demos |
| 8,542,738 B2 | 9/2013 | Demos |
| 8,559,513 B2 | 10/2013 | Demos |
| 8,699,572 B2 | 4/2014 | Demos |
| 8,737,472 B2 | 5/2014 | Demos |
| 8,761,257 B2 | 6/2014 | Demos |
| 8,767,829 B2 | 7/2014 | Demos |
| 8,873,629 B2 | 10/2014 | Demos |
| 8,873,632 B2 | 10/2014 | Demos |
| 8,942,285 B2 | 1/2015 | Demos |
| 9,078,002 B2 | 7/2015 | Demos |
| 9,083,979 B2 | 7/2015 | Demos |
| 9,232,232 B2 | 1/2016 | Demos |
| 9,247,269 B2 | 1/2016 | Demos |
| 2001/0028725 A1 | 10/2001 | Nakagawa et al. |
| 2002/0154693 A1 | 10/2002 | Demos |
| 2002/0159527 A1 | 10/2002 | Pelagotti et al. |
| 2002/0186766 A1 | 12/2002 | Adelaide |
| 2003/0112863 A1 | 6/2003 | Demos |
| 2003/0112873 A1 | 6/2003 | Demos |
| 2004/0155894 A1 | 8/2004 | Van Dijk |
| 2005/0123044 A1 | 6/2005 | Katsavounidis |
| 2005/0254649 A1 | 11/2005 | Demos |
| 2006/0120466 A1 | 6/2006 | Yoshinari et al. |
| 2008/0043848 A1 | 2/2008 | Kuhn |
| 2009/0213932 A1 | 8/2009 | Haskell et al. |
| 2013/0070581 A1 | 3/2013 | Clark et al. |
| 2015/0271520 A1 | 9/2015 | Demos |
| 2015/0271521 A1 | 9/2015 | Demos |
| 2016/0007040 A1 | 1/2016 | Demos |
| 2016/0007041 A1 | 1/2016 | Demos |

FOREIGN PATENT DOCUMENTS

| | | |
|---|---|---|
| CN | 1220065 | 6/1999 |
| EP | 0511778 | 11/1992 |
| EP | 0531041 | 3/1993 |
| EP | 0534350 | 3/1993 |
| EP | 0634871 | 1/1995 |
| EP | 0782343 | 7/1997 |
| EP | 0831660 | 3/1998 |
| EP | 0888013 | 12/1998 |
| EP | 1081958 | 3/2001 |
| EP | 1369820 | 12/2003 |
| JP | 02-192378 | 7/1990 |
| JP | 02-285816 | 11/1990 |
| JP | 05-37915 | 2/1993 |
| JP | 05-236456 | 9/1993 |
| JP | 06-165150 | 6/1994 |
| JP | 06-350995 | 12/1994 |
| JP | 09-163376 | 6/1997 |
| JP | 11-239351 | 8/1999 |
| WO | WO 95/04433 | 2/1995 |
| WO | WO 97/28507 | 8/1997 |
| WO | WO 97/40623 | 10/1997 |
| WO | WO 98/44743 | 10/1998 |
| WO | WO 99/20040 | 4/1999 |
| WO | WO 99/20045 | 4/1999 |
| WO | WO 00/56077 | 9/2000 |
| WO | WO 01/33864 | 5/2001 |
| WO | WO 03/007119 | 1/2003 |
| WO | WO 03/041041 | 5/2003 |
| WO | WO 2004/004310 | 1/2004 |

OTHER PUBLICATIONS

"IEEE Standard Specification for the Implementations of 8x8 Inverse Discrete Cosine Transforms," IEEE Std 1180-1990, The Institute of Electrical and Electronics Engineers, Inc.; United States of America, 12 pages (1991).

Adams, Jr., "Interactions between color plane interpolation and other image processing functions in electronic photography", Proc. SPIE 2416, Cameras and Systems for Electronic Photography and Scientific Imaging, 2416:144-151 Feb. 5, 1995.

Aravind et al., "Packet Loss Resilience of MPEG-2 Scalable Video Coding Algorithms," IEEE Transactions on Circuits and Systems for Video Technology 6(5): 426-435 (Oct. 1996).

Bjontegaard et al., "H.26L Test Model Long Term No. 4 (TML-4)", 10. VCEG Meeting; May 16, 2000-May 19, 2000; Osaka, JP; (Video Codingexperts Group of ITU-T SG.16), No. q15j72d0, Jun. 16, 2000, XP030003092, ISSN: 0000-0464, 30 pages.

Bjontegaard et al., "H.26L Test Model Long Term No. 5 (TML-5) Draft0", ITU-T Telecommunication Standardization Sector of ITU, Geneva, CH, 11th Meeting, Portland, OR, USA, Aug. 22-25, 2000, Aug. 22, 2000, pp. 1-31, XP001086628.

(56) References Cited

OTHER PUBLICATIONS

Bloomfield, "Copy Protection—déjà vu," Broadcast Engineering 40(11): 14-15 (Oct. 1998).
Demos, "A Comparison of Hierarchical High Definition Imagery Coding Schemes," DemoGraFX Corp. IEEE, pp. 68-75 (1992).
Demos, "An Example Representation for Image Color and Dynamic Range Which is Scalable, Interoperable, and Extensible," 135th Technical Conference, Society of Motion Picture and Television Engineers, Oct. 1993, Los Angeles, CA, 22 pages.
Demos, "Temporal and Resolution Layering in Advanced Television," SPIE 2663: 52-68 (Nov. 1995).
Demos, "The Use of Logarithmic and Density Units for Pixels," SMPTE Journal 100(10): Oct. 1990, pp. 805-816.
Flierl et al., "A Locally Optimal Design Algorithm for Block-Based Multi-Hypothesis Motion-Compensated Prediction," Proceedings of the Data Compression Conference, 1998, Snowbird, UT, USA, Mar. 30-Apr. 1, 1998, Los Alamitos, CA, USA, IEEE Comput. Soc., US Mar. 30, 1998, pp. 239-248.
Flierl et al., "Multihypothesis Prediction for B frames", ITU Study Group 16—Video Coding Experts Group—ISO/IEC MPEG & ITU-T VCEG(ISO/IEC JTC1/SC29/WG11 and ITU-T SG16 06), 14th Meeting, Santa Barbara, CA, USA, Sep. 24-27, 2001, No. VCEG-N40, Sep. 22, 2001, pp. 1-11, XP030003290.
Girod et al., "High-order motion compensation for low bit-rate video," Proceedings of IX European Signal Processing Conference (EUSIPCO-98), Island of Rhodes, Greece, Sep. 8-11, 1998, pp. A1-A4, XP55123785, Retrieved from the Internet: URL: http://people.kth.se/~mflierl/Publications/girod:98-eusipco.pdf.
Girod, "Why B-Pictures Work: A Theory of Multi-Hypothesis Motion-Compensated Prediction," Proceedings of 1998 International Conference on Image Processing, 1998, Chicago, IL, Oct. 4-7, 1998, Lost Alamitos, CA, USA, IEEE Comput. Soc., US, vol. 2, Oct. 4, 1998, pp. 213-217.
H.261, ITU-T Telecommunication Standardization Sector of ITU, Line Transmission of non-telephone signals. "Video codec for audiovisual services at px64 kbits/s," Mar. 1993, 29 pages.
H.261, ITU-T, "Video codec for audiovisual services at px64 kbits/s," ITU-T Rec. H.261, Nov. 1990, 32 pages.
H.262, ITU-T and ISO.IEC JTC 1, "Generic coding of moving pictures and associated audio information—Part 2: Video," ITU-T Rec. H.262 and ISO/IEC 13818-2 (MPEG-2), Jul. 1995, 211 pages.
H.263 Appendix III, ITU-T Telecommunication Standardization Sector of ITU, Series H: Audiovisual and Multimedia Systems, Infrastructure of audiovisual services—coding of moving video. Video coding for low bit rate communication, Appendix III: Examples for H.263 encoder/decoder implementations, (Jun. 2001), 48 pages.
H.263, ITU-T Telecommunication Standardization Sector of ITU, Series H: Audiovisual and Multimedia Systems, Infrastructure of audiovisual services—coding of moving video. Video coding for low bit rate communication, (Jan. 2005), 226 pages.
Hannuksela, "Generalized B/MH-Picture Averaging", ITU Study Group 16—Video Coding Experts Group—ISO/IEC MPEG & ITU-T VCEG (ISO/IEC JTC1/SC29/WG11 and ITU-T SG16 06), 3rd Meeting, Fairfax, VA, USA, May 6-10, 2002, No. JVT-0077, May 6, 2002, pp. 1-8, XP030005186.
Index of /ftp/video-site/0005_Osa, Sep. 13, 2001, XP55060747, Retrieved from the Internet: URL:http://web.archive.org/web/20010913144650/http://standards.pictel.com/ftp/video-site/0005_OSA/ [retrieved on Apr. 23, 2013], 3 pages.
Index of /ftp/video-site/0008_Por, Sep. 13, 2001, pp. 1-2, XP55055875, Retrieved from the Internet: URL:http://web.archive.org/web/20010913145317/http://standards.pictel.com/ftp/video-site/0008_Por [retrieved on Mar. 8, 2013].
ISO/IEC 14496-2 International Standard, Information technology—coding of audio-visual objects—Part 2: visual, 2nd Edition Dec. 1, 2001, 536 pages.
ISO/IEC 14496-2 International Standard, Information technology—coding of audio-visual objects—Part 2: visual, 2nd Edition, Amendment 2: Streaming video profile, Feb. 1, 2002, 61 pages.
ISO/IEC JTC 1, "Coding of audio-visual objects—Part 2: Visual," ISO/IEC 14496-2 (MPEG-4 Part 2), Dec. 1999, 348 pages.
ITU-T Recommendation and Final Draft International Standard of Joint Video Specification (ITU-T Rec. H.264 | ISO/IEC 14496-10, May 23-27, 2003, 269 pages.
ITU-T, "Video coding for low bit rate communication," ITU-T Rec. H. 263, Feb. 1998, 167 pages.
ITU-T, "Video coding for low bit rate communication," ITU-T Rec. H. 263, Mar. 1996, 52 pages.
Joint Video Team (JVT) of ISO/IEC MPEG and ITU-T VCEG, Joint Committee Draft (CD), May 10, 2002, JVT-C167, p. i-ix, 1-132, 141 pages.
JVT-0000r2.txt, May 3, 2002, XP55055879, Retrieved from the Internet: URL:http://wftp3.itu.int/av-arch/jvt-site/2002_05_Fairfax/JVT-0000r2.txt [retrieved on Mar. 8, 2013].
Kikuchi et al., "Improved multiple frame motion compensation using frame interpolation," Video Standards and Drafts, 2nd JVT Meeting, GENEVA, Ch, Jan. 29-Feb. 1, 2002, No. JVT-B075, 5 pages.
Kikuchi et al., "Multi-frame interpolative prediction with modified syntax," ITU Study Group 16—Video Coding Experts Group—ISO/IEC MPEG & ITU-T VCEG(ISO/IEC JTC1/SC29/WG11 and ITU-T SG16 06), 3rd Meeting, Fairfax, VA, USA, May 6-10, 2002, No. JVT-C066, May 6, 2002, pp. 1-13, XP030005175.
Kikuchi, "Improved multiframe motion compensation using frame interpolation," ITU Study Group 16—Video Coding Experts Group—ISO/IEC MPEG & ITU-T VCEG(ISO/IEC JTC1/SC29/WG11 and ITU-T SG16 Q6), 2nd Meeting, Geneva, CH, Jan. 29-Feb. 1, 2002, No. JVT-B075, Jan. 29, 2002, pp. 1-8 XP030005075.
Lillevold, "Improved direct mode for B pictures in TML", ITU Study Group 16—Video Coding Experts Group—ISO/IEC MPEG & ITU-T VCEG(ISO/IEC JTC1/SC29/WG11 and ITU-T SG16 Q6), 11th Meeting, Portland, OR, USA, Aug. 22-25, 2000, No. q15k44, Aug. 16, 2000, pp. 1-2, XP030003136.
Lim, "A migration path to a better digital television system," SMPTE Journal 103(1): 2-6, Jan. 1, 1994.
List of Documents for the Eleventh Meeting ITU-T Q. 15/5G16 Video Coding Experts Group—Document q15k00r1.doc, Mar. 13, 2001, XP55055729, ITU-T Q. 15/16 Advanced Video Coding Experts Group, 11th meeting, Portland, Oregon, USA, Aug. 22-25, 2000 Retrieved from the Internet: URL:http://wftp3.itu.int/av-arch/video-site/0008_Por/q15k00r1.doc [retrieved on Mar. 7, 2013].
List of Documents for the Tenth Meeting ITU-T Q.15/SG16 Video Coding Experts Group—Document q15j00r2.doc, Mar. 14, 2001, XP55060780, ITU-T Q.15/16 Video Coding Experts Group, 10th meeting, Osaka, Japan, May 16-19, 2000; Retrieved from the Internet: URL:http://wftp3.itu.int/av-arch/video-site/0005_Osa/ [retrieved on Apr. 23, 2013], 7 pages.
Pinkerton, "Digital video stymied by content protection," Dealscope Consumer Electronics Marketplace, Philadelphia, Jan. 1999, vol. 4, issue 1, p. 32.
Poynton, "The rehabilitation of gamma," Proceedings of SPIE/IS&T Conference vol. 3299, San Jose, Calif., Jan. 26-30, 1998 (Bellingham, Wash.: SPIE, 1998), pp. 232-249, 18 pages.
Puri et al., "Temporal Resolution Scalable Video Coding, " Image Processing. 1994 International Conference, IEEE, pp. 947-951 (1994).
Report of Joint Video Team (JVT) Meeting #3, ISO/IEC JTC1/SC29/WG11 (MPEG) and ITU-T SGI 6 06 (VCEG) May 6-10, 2002, Fairfax, VA, Communications Standards Review, vol. 13, No. 25, Jul. 24, 2002, pp. 1-3,6-8,15-16, XP55055740.
Richardson, "H.264 and MPEG-4 Video Compression, chapter 4, The MPEG-4 and H.264 Standards, Iain E. Richardson", Oct. 17, 2003, XPOS0001624.
Subject: Transfer of ftp://standards.pictel.com to ITU, Apr. 4, 2003, pp. 1-3, XP55055877, Retrieved from the Internet: URL:http://wftp3.itu.int/av-arch/T ransfer%20of%20standards.pictel.com%20to%20ITU.htm [retrieved on Mar. 8, 2013].
Sullivan "Report of Fairfax JVT Meeting (#3)"; Document JVT-COOI d3, May 10, 2002, pp. 1,8, XP55055896.
Sullivan "Terms of Reference Draft Resulting from Pre-meeting", 15. VCEG Meeting; 58. MPEG Meeting; Apr. 12, 2001-Jun. 12,

(56) References Cited

OTHER PUBLICATIONS

2001; Pattaya,TH; (Video Coding Experts Group of ITU-T SG.16), No. VCEG-054, Dec. 23, 2001, XP030003387, ISSN: 0000-0459.
Sullivan, "Draft for H.263++ Annexes U, V, and W to Recommendation H.263", Nov. 2000, pp. 1-46, XP-000986538.
Sullivan, "Meeting Report of the Eleventh Meeting (Meeting K) of the ITU-T Q.15/16 Advanced Video Coding Experts Group—Portland, Oregon, USA, Aug. 22-24, 2000 (Study Period 1997-2000)—Document q15k60d1.doc", Oct. 11, 2000, pp. i,13, XP55055742, Retrieved from the Internet: URL:http://wftp3.itu.int/av-arch/video-site/0008_Por/q15k60d1.doc [retrieved on Mar. 7, 2013].
Sullivan, "Preliminary Invitation to the Third JVT Meeting Fairfax, Virginia, USA, May 6-10 , 2002"; Document JVT-C-TD0OrO, Apr. 2, 2002, pp. 1-6, XP55055895.
Tudor, "MPEG-2 Video Compression Tutorial," IEE Colloquium on MPEG-2 (Digest Nr. 1995/012), London, UK, Jan. 24, 1995, pp. 2/1-2/8.
Vincent et al., "Spatial Prediction in Scalable Video Coding," International Broadcasting Convention, IEEE Conference Publication No. 413, RAI International Congress and Exhibition Centre, Amsterdam, The Netherlands, Sep. 14-18, 1995, pp. 244-249.
wftp3.itu.int - /av-arch/video-site/0005_Osa/, Oct. 11, 2010, XP55060753, Retrieved from the Internet: URL:http://wftp3.itu.int/av-arch/video-site/0005_Osa/ [retrieved on Apr. 23, 2013], 2 pages.
wftp3.itu.int - /av-arch/video-site/0008_Por/, Mar. 9, 2010, XP55055878, Retrieved from the Internet: URL:http://wftp3.itu.int/av-arch/video-site/0008_Por/[retrieved on Mar. 8, 2013].
Wiegand, "Joint Model No. 1 (JM-1)", Joint Video Team (JVT) of ISO/IEC MPEG and ITU-T VCEG, Pattaya, Thailand, Dec. 3-7, 2001, No. JVT-A003, generated Jan. 18, 2002, 78 pages, XP030005001.
Wyszecki and Stiles, "*Color Science: concepts and methods, quantitative data and formulae*," John Wiley & Sons, $2^{nd}$ Edition, pp. 485-489 (1982).
Chinese Notice of Interview, Chinese Application No. 97193217.4, dated Aug. 15, 2005, 2 pages.
Chinese Office Action, Chinese Application No. 97193217.4, dated Dec. 17, 2004, 7 pages.
Chinese Office Action, Chinese Application No. 97193217.4, dated Dec. 26, 2003, 8 pages
Korean Office Action, Korean Application No. 98-705826, dated Mar. 31, 2004, 2 pages.
International PCT Written Opinion, PCT Application No. PCT/US97/00902, dated Jan. 30, 1998, 6 pages.
International Preliminary Examination Report, PCT Application No. PCT/US97/00902, dated Oct. 13, 1998, 21 pages.
Chinese Office Action, Chinese Application No. 02805857.7, dated May 13, 2005, 11 pages.
Chinese Office Action, Application Serial No. 02813795.7, dated Aug. 18, 2006, 7 pages [English translation].
Chinese Office Action, Application Serial No. 02813795.7, dated Jan. 26, 2007, 8 pages [includes English translation].
Chinese Office Action, Application Serial No. 02813795.7, dated Jul. 13, 2007, 6 pages [includes English translation].
Japanese Office Action, Application Serial No. 2003-512817, dispatched Jan. 8, 2008, 6 pages [includes English translation].
Chinese Office Action, Chinese Application No. 02813792.2, dated Mar. 11, 2005, 8 pages.
International Written Opinion, PCT Application No. PCT/US02/22205, dated Apr. 2, 2003, 6 pages.
Australian Examination Report, Application Serial No. 2003247759, dated Mar. 9, 2007, 2 pages.
Office Action for Australian Application No. 2015200722, dated Feb. 26, 2015, 2 pages.
Office Action and Search Report from Chinese Application No. 201110166837.X, dated Dec. 4, 2013, 11 pages [includes English translation].
Office Action from Chinese Application No. 201110166809.8, dated Dec. 4, 2013, 8 pages [includes English translation].
Chinese Office Action issued in Application No. 201110166809.8, on Jun. 5, 2013, 14 pages [includes English translation].
Notice of Allowance for Chinese App. No. 201110166810.0, mailed May 30, 2014, 4 pages [English translation].
Office Action from Chinese Application 201110166810.0, dated Jan. 6, 2014, 7 pages [includes English translation].
Chinese Office Action issued in Application No. 201110166810.0, on Jun. 26, 2013, 14 pages [includes English translation].
Office Action from Chinese Application No. 201110166847.3, dated Oct. 10, 2013, 9 pages [includes English translation].
Office Action and Search Report for Chinese App. No. 201110166839.9, issued Jan. 6, 2014, 16 pages [includes English translation].
Chinese Office Action issued in Application No. 201110166839.9 on Jun. 26, 2013,15 pages [includes English translation].
European Summons to attend oral proceedings pursuant to Rule 115(1) EPC, for Application No. 10005839.5, dated May 10, 2013, 9 pages.
European Summons to attend oral proceedings pursuant to Rule 115(1) EPC, for Application No. 10005839.5, dated May 24, 2013, 3 pages.
Office Action for European Application No. 10005839.5, dated Nov. 20, 2013, 26 pages.
Office Action for European Application No. 10005839.5, dated Mar. 22, 2013, 16 pages.
European Summons to attend oral proceedings pursuant to Rule 115(1) EPC, for Application No. 10008909.3, dated May 10, 2013, 8 pages.
European Summons to attend oral proceedings pursuant to Rule 115(1) EPC, for Application No. 10008909.3, dated May 24, 2013, 3 pages.
Office Action for European Application No. 10008909.3, dated Mar. 22, 2013, 16 pages.
Office Action for European Application No. 10008909.3, mailed Nov. 14, 2013, 25 pages.
Decision to refuse a European Patent application for App. No. EP 11174098.1, dated Jul. 1, 2015, 9 pages.
European Search Report for Application No. 11174098 dated Jul. 10, 2014, 13 pages.
Office Action for European App. No. 11174098.1 dated Sep. 18, 2014, 9 pages.
Office Action for European Application No. 11174110.4 dated Sep. 18, 2014, 9 pages.
European Search Report for Application No. 11174110.4, dated Jul. 8, 2014, 6 pages.
Office Action for European Application No. 11174110.4 dated Aug. 18, 2014, 10 pages.
European Search Report for Application No. 14172498.9, mailed Aug. 19, 2014, 4 pages.
Office Action for European Application No. 14172498.9 dated Sep. 4, 2014, 6 pages.
Japanese Office Action, Application Serial No. 2004-518016, dispatched Jan. 8, 2008, 6 pages [includes English translation].
Korean Office Action, Application Serial No. 10-2004-7021483, dated Jun. 26, 2006, 4 pages, [includes English translation].
Office Action and Search Report from Malaysian Application No. PI20081944, mailed Oct. 31, 2013, 3 pages.
Singapore Office Action (with Australian Search Report), Singaporean Application No. 200405790-7, dated Sep. 23, 2005.
Singapore Search and Examination Report, Application Serial No. 200405790-7, dated May 2, 2007, 5 pages.
Singapore Search and Examination Report, Application Serial No. 200405790-7, dated Oct. 19, 2005, 9 pages.
Australian Examiner's Report, Application No. 2008200457, dated Feb. 24, 2010, 2 pages.
Canadian Office Action, Canadian Application No. 2245172, dated Jun. 2, 2003, 3 pages.
Canadian Office Action, Canadian Patent Application No. 2452504 dated Aug. 22, 2007, 2 pages.
Canadian Office Action, Canadian Patent Application No. 2490378, dated Sep. 1, 2009, 3 pages.
Chinese Office Action, Chinese Application No. 03814629.0, dated Jul. 31, 2009, 9 pages [includes English translation].

(56) References Cited

OTHER PUBLICATIONS

Chinese Office Action, Chinese Application No. 03814629.0, dated Nov. 13, 2009, 7 pages [includes English translation].
Chinese Office Action, Chinese Application No. 03814629.0, dated Sep. 2, 2010, 7 pages [includes English translation].
Chinese Office Action, Chinese Application No. 97193217.4, dated May 27, 2005, 8 pages [includes English translation].
European Search Report for Application No. 02746990.7, dated Dec. 16, 2005, 3 pages.
European Search Report for Application No. 03762175, completed Feb. 10, 2009, 5 pages.
European Search Report for Application No. 10005839.5 dated May 9, 2011 6 pages.
European Search Report for Application No. 10008909.3 dated May 9, 2011 7 pages.
European Search Report for Application No. 97903871.8, dated Feb. 28, 2001, 2 pages.
European Search Report for Application No. 97903871.8, dated Jan. 21, 1999, 3 pages.
International Preliminary Examination Report, PCT Application No. PCT/US02/06078, dated Feb. 20, 2004, 3 pages.
International Preliminary Examination Report, PCT Application No. PCT/US02/22063, dated Jun. 14, 2004, 3 pages.
International Preliminary Examination Report, PCT Application No. PCT/US02/22205, dated Mar. 2, 2004, 6 pages.
International Search Report, Application Serial No. PCT/US02/06078, dated Apr. 9, 2004, 3 pages.
International Search Report, Application Serial No. PCT/US02/22205, dated Jan. 28, 2003, 3 pages.
International Search Report, PCT Application No. PCT/US02/18884, dated Dec. 6, 2002, 1 page.
International Search Report, PCT Application No. PCT/US02/22063, dated Jan. 15, 2003, 1 page.
International Search Report, PCT Application No. PCT/US03/20397, dated Jan. 10, 2005, 1 page.
International Search Report, PCT Application No. PCT/US97/00902, dated May 8, 1997, 1 page.
Japanese Office Action, Application Serial No. 9-527690, dated Jan. 11, 2005, 6 pages [includes English translation].
Mexican Office Action, Mexican Application No. 986108, dated Jan. 16, 2004, 5 pages.
Office Action for European Application No. 03762175.2, issued on Jul. 16, 2009, 8 pages.
Summons to attend oral proceedings pursuant to Rule 115(1) EPC for European Application No. 14172498.9, dated Jun. 5, 2015, 7 pages.
Provision of the minutes in accordance with Rule 124(4) EPC for European Application No. 11174098.1, dated Jun. 26, 2015, 7 pages.
Notice of Acceptance for Australian App. No. 2015203602, Aug. 4, 2015, 2 pages.
Notice of Acceptance for Australian App. No. 2015218509, Oct. 12, 2015, 2 pages.
Office Action in Australian App. No. 2015218509, Sep. 7, 2015, 2 pages.
Notification of Allowance for Chinese App. No. 201110166828, Sep. 18, 2015, 4 pages.
Decision to refuse a European Patent application for App. No. EP 14172498.9, Oct. 8, 2015, 2 pages.
Reexamination Decision for Chinese App. No. 201110166809, Sep. 1, 2015, 9 pages.
Reexamination Decision for Chinese App. No. 201110166847.3, Jun. 29, 2016, 6 pages.

\* cited by examiner

Proportional Motion Vector Weighting
(Prior Art)

Pixel Value Proportional Weighting

Blended Pixel Value Weighting

REGION SIZING FOR MACROBLOCKS

CROSS-REFERENCE TO RELATED APPLICATIONS

This application is a continuation of, and claims the benefit of priority to U.S. patent application Ser. No. 14/856,791, filed Sep. 17, 2015, which is a continuation of, and claims the benefit of priority to U.S. patent application Ser. No. 14/729,628, filed Jun. 3, 2015, now U.S. Pat. No. 9,247,269, and is a continuation of, and claims the benefit of priority to U.S. patent application Ser. No. 14/856,691, filed Sep. 17, 2015, which is a continuation of, and claims the benefit of priority to U.S. patent application Ser. No. 14/729,628, filed Jun. 3, 2015, now U.S. Pat. No. 9,247,269. This application is also continuation of, and claims the benefit of priority to U.S. patent application Ser. No. 14/729,572, filed Jun. 3, 2015, now U.S. Pat. No. 9,232,232. U.S. patent application Ser. Nos. 14/729,628 and 14/729,572 are both continuations of, and claim the benefit of priority to U.S. patent application Ser. No. 14/565,803, filed Dec. 10, 2014, now U.S. Pat. No. 9,083,979. U.S. patent application Ser. Nos. 14/729,628 and 14/729,572 are both continuations of, and claim priority to U.S. patent application Ser. No. 14/565,824, filed Dec. 10, 2014, now U.S. Pat. No. 9,078,002. U.S. patent application Ser. Nos. 14/565,803 and 14/565,824 are continuations of U.S. patent application Ser. No. 13/915,056, filed Jun. 11, 2013, now U.S. Pat. No. 8,942,285, which is a continuation of U.S. patent application Ser. No. 13/859,373, filed Apr. 9, 2013, now U.S. Pat. No. 8,767,829, which is a continuation of U.S. patent application Ser. No. 13/675,622, filed Nov. 13, 2012, now U.S. Pat. No. 8,503,529, which is a continuation of U.S. patent application Ser. No. 12/986,220, filed Jan. 7, 2011, now U.S. Pat. No. 8,401,078, which is a continuation of U.S. patent application Ser. No. 12/644,953, filed Dec. 22, 2009, now U.S. Pat. No. 8,477,851, which is a continuation of U.S. patent application Ser. No. 12/567,161, filed Sep. 25, 2009, now U.S. Pat. No. 8,050,323, which is a continuation of U.S. patent application Ser. No. 11/831,723, filed Jul. 31, 2007, now U.S. Pat. No. 7,894,524, and which is a continuation application of U.S. patent application Ser. No. 10/187,395, filed on Jun. 28, 2002, now U.S. Pat. No. 7,266,150. U.S. patent application Ser. No. 10/187,395 is a continuation-in-part of U.S. patent application Ser. No. 09/904,203, filed on Jul. 11, 2001, now U.S. Pat. No. 6,816,552. The disclosures of all of the above applications are incorporated herein by reference in their entirety.

TECHNICAL FIELD

This invention relates to video compression, and more particularly to improved interpolation of video compression frames in MPEG-like encoding and decoding systems.

BACKGROUND

MPEG Video Compression

MPEG-2 and MPEG-4 are international video compression standards defining respective video syntaxes that provides an efficient way to represent image sequences in the form of more compact coded data. The language of the coded bits is the "syntax." For example, a few tokens can represent an entire block of samples (e.g., 64 samples for MPEG-2). Both MPEG standards also describe a decoding (reconstruction) process where the coded bits are mapped from the compact representation into an approximation of the original format of the image sequence. For example, a flag in the coded bitstream may signal whether the following bits are to be preceded with a prediction algorithm prior to being decoded with a discrete cosine transform (DCT) algorithm. The algorithms comprising the decoding process are regulated by the semantics defined by these MPEG standards. This syntax can be applied to exploit common video characteristics such as spatial redundancy, temporal redundancy, uniform motion, spatial masking, etc. In effect, these MPEG standards define a programming language as well as a data format. An MPEG decoder must be able to parse and decode an incoming data stream, but so long as the data stream complies with the corresponding MPEG syntax, a wide variety of possible data structures and compression techniques can be used (although technically this deviates from the standard since the semantics are not conformant). It is also possible to carry the needed semantics within an alternative syntax.

These MPEG standards use a variety of compression methods, including intraframe and interframe methods. In most video scenes, the background remains relatively stable while action takes place in the foreground. The background may move, but a great deal of the scene often is redundant. These MPEG standards start compression by creating a reference frame called an "intra" frame or "I frame". I frames are compressed without reference to other frames and thus contain an entire frame of video information. I frames provide entry points into a data bitstream for random access, but can only be moderately compressed. Typically, the data representing I frames is placed in the bitstream every 12 to 15 frames (although it is also useful in some circumstances to use much wider spacing between I frames). Thereafter, since only a small portion of the frames that fall between the reference I frames are different from the bracketing I frames, only the image differences are captured, compressed, and stored. Two types of frames are used for such differences—predicted frames (P frames), and bi-directional predicted (or interpolated) frames (B frames).

P frames generally are encoded with reference to a past frame (either an I frame or a previous P frame), and, in general, are used as a reference for subsequent P frames. P frames receive a fairly high amount of compression. B frames provide the highest amount of compression but require both a past and a future reference frame in order to be encoded. Bi-directional frames are never used for reference frames in standard compression technologies. P and I frames are "referenceable frames" because they can be referenced by P or B frames.

Macroblocks are regions of image pixels. For MPEG-2, a macroblock is a 16×16 pixel grouping of four 8×8 DCT blocks, together with one motion vector for P frames, and one or two motion vectors for B frames. Macroblocks within P frames may be individually encoded using either intra-frame or inter-frame (predicted) coding. Macroblocks within B frames may be individually encoded using intra-frame coding, forward predicted coding, backward predicted coding, or both forward and backward (i.e., bi-directionally interpolated) predicted coding. A slightly different but similar structure is used in MPEG-4 video coding.

After coding, an MPEG data bitstream comprises a sequence of I, P, and B frames. A sequence may consist of almost any pattern of I, P, and B frames (there are a few minor semantic restrictions on their placement). However, it is common in industrial practice to have a fixed frame pattern (e.g., IBBPBBPBBPBBPBB).

Motion Vector Prediction

In MPEG-2 and MPEG-4 (and similar standards, such as H.263), use of B-type (bi-directionally predicted) frames have proven to benefit compression efficiency. Motion vectors for each macroblock of such frames can be predicted by any one of the following three methods:

Mode 1: Predicted forward from the previous I or P frame (i.e., a non-bidirectionally predicted frame).

Mode 2: Predicted backward from the subsequent I or P frame.

Mode 3: Bi-directionally predicted from both the subsequent and previous I or P frame.

Mode 1 is identical to the forward prediction method used for P frames. Mode 2 is the same concept, except working backward from a subsequent frame. Mode 3 is an interpolative mode that combines information from both previous and subsequent frames.

In addition to these three modes, MPEG-4 also supports a second interpolative motion vector prediction mode for B frames: direct mode prediction using the motion vector from the subsequent P frame, plus a delta value (if the motion vector from the co-located P macroblock is split into 8×8 mode—resulting in four motion vectors for the 16×16 macroblock—then the delta is applied to all four independent motion vectors in the B frame). The subsequent P frame's motion vector points at the previous P or I frame. A proportion is used to weight the motion vector from the subsequent P frame. The proportion is the relative time position of the current B frame with respect to the subsequent P and previous P (or I) frames.

FIG. 1 is a time line of frames and MPEG-4 direct mode motion vectors in accordance with the prior art. The concept of MPEG-4 direct mode (mode 4) is that the motion of a macroblock in each intervening B frame is likely to be near the motion that was used to code the same location in the following P frame. A delta is used to make minor corrections to a proportional motion vector derived from the corresponding motion vector (MV) 103 for the subsequent P frame. Shown in FIG. 1 is the proportional weighting given to the motion vectors 101, 102 for each intermediate B frame 104*a*, 104*b* as a function of "time distance" between the previous P or I frame 105 and the next P frame 106. The motion vector 101, 102 assigned to a corresponding intermediate B frame 104*a*, 104*b* is equal to the assigned weighting value (⅓ and ⅔, respectively) times the motion vector 103 for the next P frame, plus the delta value.

With MPEG-2, all prediction modes for B frames are tested in coding, and are compared to find the best prediction for each macroblock. If no prediction is good, then the macroblock is coded stand-alone as an "I" (for "intra") macroblock. The coding mode is selected as the best mode among forward (mode 1), backward (mode 2), and bi-directional (mode 3), or as intra coding. With MPEG-4, the intra coding choice is not allowed. Instead, direct mode becomes the fourth choice. Again, the best coding mode is chosen, based upon some best-match criteria. In the reference MPEG-2 and MPEG-4 software encoders, the best match is determined using a DC match (Sum of Absolute Difference, or "SAD").

The number of successive B frames in a coded data bitstream is determined by the "M" parameter value in MPEG. M minus one is the number of B frames between each P frame and the next P (or I). Thus, for M=3, there are two B frames between each P (or I) frame, as illustrated in FIG. 1. The main limitation in restricting the value of M, and therefore the number of sequential B frames, is that the amount of motion change between P (or I) frames becomes large. Higher numbers of B frames mean longer amounts of time between P (or I) frames. Thus, the efficiency and coding range limitations of motion vectors create the ultimate limit on the number of intermediate B frames.

It is also significant to note that P frames carry "change energy" forward with the moving picture stream, since each decoded P frame is used as the starting point to predict the next subsequent P frame. B frames, however, are discarded after use. Thus, any bits used to create B frames are used only for that frame, and do not provide corrections that aid decoding of subsequent frames, unlike P frames.

SUMMARY

Aspects of the invention are directed to a method, system, and computer programs for improving the image quality of one or more predicted frames in a video image compression system, where each frame comprises a plurality of pixels.

In one aspect, the invention includes determining the value of each pixel of bi-directionally predicted frames as a weighted proportion of corresponding pixel values in non-bidirectionally predicted frames bracketing a sequence of bi-directionally predicted frames. In one embodiment, the weighted proportion is a function of the distance between the bracketing non-bidirectionally predicted frames. In another embodiment, the weighted proportion is a blended function of the distance between the bracketing non-bidirectionally predicted frames and an equal average of the bracketing non-bidirectionally predicted frames.

In another aspect of the invention, interpolation of pixel values is performed on representations in a linear space, or in other optimized non-linear spaces differing from an original non-linear representation.

Other aspects of the invention include systems, computer programs, and methods encompassing:

A video image compression system having a sequence of referenceable frames comprising picture regions, in which at least one picture region of at least one predicted frame is encoded by reference to two or more referenceable frames.

A video image compression system having a sequence of referenceable frames comprising picture regions, in which at least one picture region of at least one predicted frame is encoded by reference to one or more referenceable frames in display order, where at least one such referenceable frame is not the previous referenceable frame nearest in display order to the at least one predicted frame.

A video image compression system having a sequence of referenceable frames comprising macroblocks, in which at least one macroblock within at least one predicted frame is encoded by interpolation from two or more referenceable frames.

A video image compression system having a sequence of referenceable and bidirectional predicted frames comprising picture regions, in which at least one picture region of at least one bidirectional predicted frame is encoded to include more than two motion vectors, each such motion vector referencing a corresponding picture region in at least one referenceable frame.

A video image compression system having a sequence of referenceable frames comprising picture regions, in which at least one picture region of at least one predicted frame is encoded to include at least two motion vectors, each such motion vector referencing a corresponding picture region in a referenceable frame, where each such picture region of such at least one predicted frame is encoded by interpolation from two or more referenceable frames.

A video image compression system having a sequence of referenceable and bidirectional predicted frames comprising picture regions, in which at least one picture region of at least one bidirectional predicted frame is encoded as an unequal weighting of selected picture regions from two or more referenceable frames.

A video image compression system having a sequence of referenceable and bidirectional predicted frames comprising picture regions, in which at least one picture region of at least one bidirectional predicted frame is encoded by interpolation from two or more referenceable frames, where at least one of the two or more referenceable frames is spaced from the bidirectional predicted frame by at least one intervening referenceable frame in display order, and where such at least one picture region is encoded as an unequal weighting of selected picture regions of such at least two or more referenceable frames.

A video image compression system having a sequence of referenceable and bidirectional predicted frames comprising picture regions, in which at least one picture region of at least one bidirectional predicted frame is encoded by interpolation from two or more referenceable frames, where at least one of the two or more referenceable frames is spaced from the bidirectional predicted frame by at least one intervening subsequent referenceable frame in display order.

A video image compression system having a sequence of referenceable and bidirectional predicted frames comprising picture regions, in which at least one picture region of at least one bidirectional predicted frame is encoded as an unequal weighting from selected picture regions of two or more referenceable frames.

A video image compression system having a sequence of predicted and bidirectional predicted frames each comprising pixel values arranged in macroblocks, wherein at least one macroblock within a bidirectional predicted frame is determined using direct mode prediction based on motion vectors from two or more predicted frames.

A video image compression system having a sequence of referenceable and bidirectional predicted frames each comprising pixel values arranged in macroblocks, wherein at least one macroblock within a bidirectional predicted frame is determined using direct mode prediction based on motion vectors from one or more predicted frames in display order, wherein at least one of such one or more predicted frames is previous in display order to the bidirectional predicted frame.

A video image compression system having a sequence of referenceable and bidirectional predicted frames each comprising pixel values arranged in macroblocks, wherein at least one macroblock within a bidirectional predicted frame is determined using direct mode prediction based on motion vectors from one or more predicted frames, wherein at least one of such one or more predicted frames is subsequent in display order to the bidirectional predicted frame and spaced from the bidirectional predicted frame by at least one intervening referenceable frame.

A video image compression system having a sequence of frames comprising a plurality of picture regions having a DC value, each such picture region comprising pixels each having an AC pixel value, wherein at least one of the DC value and the AC pixel values of at least one picture region of at least one frame are determined as a weighted interpolation of corresponding respective DC values and AC pixel values from at least one other frame.

A video image compression system having a sequence of referenceable frames comprising a plurality of picture regions having a DC value, each such picture region comprising pixels each having an AC pixel value, in which at least one of the DC value and AC pixel values of at least one picture region of at least one predicted frame are interpolated from corresponding respective DC values and AC pixel values of two or more referenceable frames.

Improving the image quality of a sequence of two or more bidirectional predicted intermediate frames in a video image compression system, each frame comprising a plurality picture regions having a DC value, each such picture region comprising pixels each having an AC pixel value, including at least one of the following: determining the AC pixel values of each picture region of a bidirectional predicted intermediate frame as a first weighted proportion of corresponding AC pixel values in referenceable frames bracketing the sequence of bidirectionally predicted intermediate frames; and determining the DC value of each picture region of such bidirectional predicted intermediate frame as a second weighted proportion of corresponding DC values in referenceable frames bracketing the sequence of bidirectional predicted intermediate frames. A video image compression system having a sequence of frames comprising a plurality of pixels having an initial representation, in which the pixels of at least one frame are interpolated from corresponding pixels of at least two other frames, wherein such corresponding pixels of the at least two other frames are interpolated while transformed to a different representation, and the resulting interpolated pixels are transformed back to the initial representation.

In a video image compression system having a sequence of referenceable and bidirectional predicted frames, dynamically determining a code pattern of such frames having a variable number of bidirectional predicted frames, including: selecting an initial sequence beginning with a referenceable frame, having at least one immediately subsequent bidirectional predicted frame, and ending in a referenceable frame; adding a referenceable frame to the end of the initial sequence to create a test sequence; evaluating the test sequence against a selected evaluation criteria; for each satisfactory step of evaluating the test sequence, inserting a bidirectional frame before the added referenceable frame and repeating the step of evaluating; and if evaluating the test sequence is unsatisfactory, then accepting the prior test sequence as a current code pattern.

A video image compression system having a sequence of referenceable frames spaced by at least one bidirectional predicted frames, wherein the number of such bidirectional predicted frames varies in such sequence, and wherein at least one picture region of at least one such bidirectional predicted frame is determined using an unequal weighting of pixel values corresponding to at least two referenceable frames.

A video image compression system having a sequence of frames encoded by a coder for decoding by a decoder, wherein at least one picture region of at least one frame is based on weighted interpolations of two or more other frames, such weighted interpolations being based on at least one set of weights available to the coder and a decoder, wherein a designation for a selected one of such at least one set of weights is communicated to a decoder from the coder to select one or more currently active weights.

A video image compression system having a sequence of frames encoded by a coder for decoding by a decoder, wherein at least one picture region of at least one frame is based on weighted interpolations of two or more other frames, such weighted interpolations being based on at least one set of weights, wherein at least one set of weights is downloaded to a decoder and thereafter a designation for a selected one of such at least one set of weights is communicated to a decoder from the coder to select one or more currently active weights.

A video image compression system having a sequence of referenceable frames encoded by a coder for decoding by a decoder, wherein predicted frames in the sequence of referenceable frames are transmitted by the encoder to the decoder in a delivery order that differs from the display order of such predicted frames after decoding.

A video image compression system having a sequence of referenceable frames comprising pixels arranged in picture regions, in which at least one picture region of at least one predicted frame is encoded by reference to two or more referenceable frames, wherein each such picture region is determined using an unequal weighting of pixel values corresponding to such two or more referenceable frames.

A video image compression system having a sequence of predicted, bidirectional predicted, and intra frames each comprising picture regions, wherein at least one filter selected from the set of sharpening and softening filters is applied to at least one picture region of a predicted or bidirectional predicted frame during motion vector compensated prediction of such predicted or bidirectional predicted frame.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Overview

One aspect of the invention is based upon recognition that it is common practice to use a value for M of 3, which provides for two B frames between each P (or I) frame.

However M=2, and M=4 or higher, are all useful. It is of particular significance to note that the value of M (the number of B frames plus 1) also bears a natural relationship to the frame rate. At 24 frames per second (fps), the rate of film movies, the 1/24th second time distance between frames can result in substantial image changes frame-to-frame. At 60 fps, 72 fps, or higher frame rates, however, the time distance between adjacent frames becomes correspondingly reduced. The result is that higher numbers of B frames (i.e., higher values of M) become useful and beneficial in compression efficiency as the frame rate is increased.

Another aspect of the invention is based upon the recognition that both MPEG-2 and MPEG-4 video compression utilize an oversimplified method of interpolation. For example, for mode 3, the bi-directional prediction for each macroblock of a frame is an equal average of the subsequent and previous frame macroblocks, as displaced by the two corresponding motion vectors. This equal average is appropriate for M=2 (i.e., single intermediate B frames), since the B frame will be equidistant in time from the previous and subsequent P (or I) frames. However, for all higher values of M, only symmetrically centered B frames (i.e., the middle frame if M=4, 6, 8, etc.) will be optimally predicted using an equal weighting. Similarly, in MPEG-4 direct mode 4, even though the motion vectors are proportionally weighted, the predicted pixel values for each intermediate B frame are an equal proportion of the corresponding pixels of the previous P (or I) and subsequent P frame.

Thus, it represents an improvement to apply an appropriate proportional weighting, for M>2, to the predicted pixel values for each B frame. The proportional weighting for each pixel in a current B frame corresponds to the relative position of the current B frame with respect to the previous and subsequent P (or I) frames. Thus, if M=3, the first B frame would use 2/3 of the corresponding pixel value (motion vector adjusted) from the previous frame, and 1/3 of the corresponding pixel value from the subsequent frame (motion vector adjusted).

Figure 1:
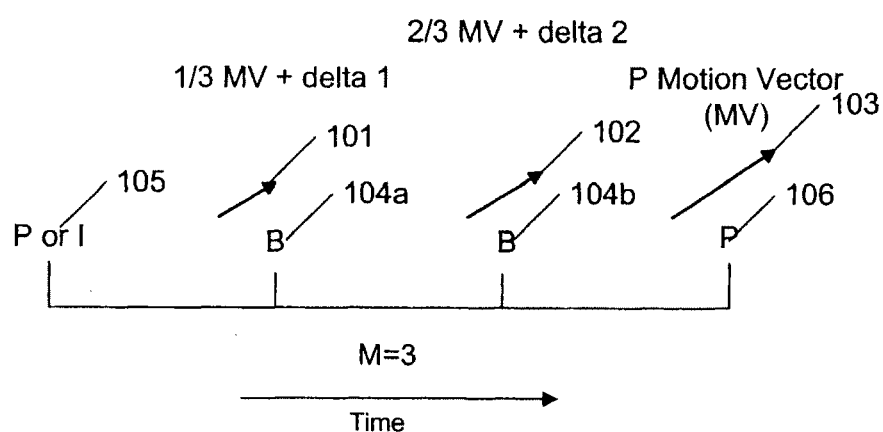
FIG. 1 is a time line of frames and MPEG-4 direct mode motion vectors in accordance with the prior art.
Figure 2:
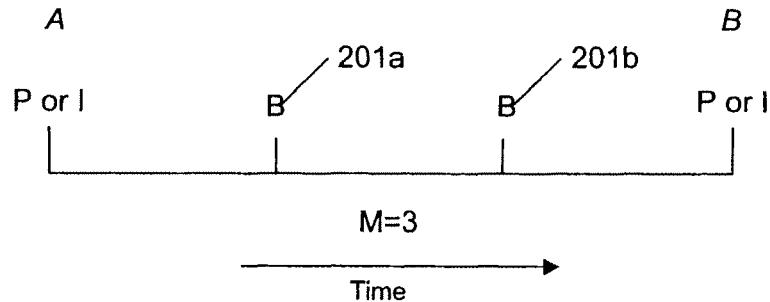
FIG. 2 is a time line of frames and proportional pixel weighting values in accordance with this aspect of the invention.

FIG. 2 is a time line of frames and proportional pixel weighting values in accordance with this aspect of the invention. The pixel values within each macroblock of each intermediate B frame 201a, 201b are weighted as a function of "distance" between the previous P or I frame A and the next P or I frame B, with greater weight being accorded to closer I or P frames. That is, each pixel value of a bi-directionally predicted B frame is a weighted combination of the corresponding pixel values of bracketing non-bidirectionally predicted frames A and B. In this example, for M=3, the weighting for the first B frame 201a is equal to 2/3A+1/3B; the weighting for the second B frame 201b is equal to 1/3A+2/3B. Also shown is the equal average weighting that would be assigned under conventional MPEG systems; the MPEG-1, 2, and 4 weighting for each B frame 201a, 201b would be equal to (A+B)/2.

Application to Extended Dynamic Range and Contrast Range

If M is greater than 2, proportional weighting of pixel values in intermediate B frames will improve the effectiveness of bi-directional (mode 3) and direct (MPEG-4 mode 4) coding in many cases. Example cases include common movie and video editing effects such as fade-outs and cross-dissolves. These types of video effects are problem coding cases for both MPEG-2 and MPEG-4 due to use of a simple DC matching algorithm, and the common use of M=3 (i.e., two intermediate B frames), resulting in equal proportions for B frames. Coding of such cases is improved by using proportional B frame interpolation in accordance with the invention.

Proportional B frame interpolation also has direct application to coding efficiency improvement for extending dynamic and contrast range. A common occurrence in image coding is a change in illumination. This occurs when an object moves gradually into (or out from) shadow (soft shadow edges). If a logarithmic coding representation is used for brightness (as embodied by logarithmic luminance Y, for example), then a lighting brightness change will be a DC offset change. If the brightness of the lighting drops to half, the pixel values will all be decreased by an equal amount. Thus, to code this change, an AC match should be found, and a coded DC difference applied to the region. Such a DC difference being coded into a P frame should be proportionally applied in each intervening B frame as well. (See co-pending U.S. patent application Ser. No. 09/905, 039, entitled "Method and System for Improving Compressed Image Chroma Information", assigned to the assignee of the present invention and hereby incorporated by reference, for additional information on logarithmic coding representations).

In addition to changes in illumination, changes in contrast also benefit from proportional B frame interpolation. For example, as an airplane moves toward a viewer out of a cloud or haze, its contrast will gradually increase. This contrast increase will be expressed as an increased amplitude in the AC coefficients of the DCT in the corresponding P frame coded macroblocks. Again, contrast changes in intervening B frames will be most closely approximated by a proportional interpolation, thus improving coding efficiency.

Improvements in dynamic range and contrast coding efficiency using proportional B frame interpolation become increasingly significant as frame rates become higher and as the value of M is increased.

Applying High M Values to Temporal Layering

Using embodiments of the invention allows an increase in the value of M, and hence the number of B frames between bracketing P and/or I frames, while maintaining or gaining coding efficiency. Such usage benefits a number of applications, including temporal layering. For example, in U.S. Pat. No. 5,988,863, entitled "Temporal and Resolution Layering for Advanced Television" (assigned to the assignee of the present invention, and incorporated by reference), it was noted that B frames are a suitable mechanism for layered temporal (frame) rates. The flexibility of such rates is related to the number of consecutive B frames available. For example, single B frames (M=2) can support a 36 fps decoded temporal layer within a 72 fps stream or a 30 fps decoded temporal layer within a 60 fps stream. Triple B frames (M=4) can support both 36 fps and 18 fps decoded temporal layers within a 72 fps stream, and 30 fps and 15 fps decoded temporal layers within a 60 fps stream. Using M=10 within a 120 fps stream can support 12 fps, 24 fps, and 60 fps decoded temporal layers. M=4 also can be used with a 144 fps stream to provide for decoded temporal layers at 72 fps and 36 fps.

As an improvement to taking every $N^{th}$ frame, multiple frames at 120 fps or 72 fps can be decoded and proportionally blended, as described in co-pending U.S. patent application Ser. No. 09/545,233, entitled "Enhancements to Temporal and Resolution Layering" (assigned to the assignee of the present invention and incorporated by reference), to improve the motion blur characteristics of the 24 fps results.

Even higher frame rates can be synthesized utilizing the methods described in co-pending U.S. patent application Ser. No. 09/435,277, entitled "System and Method for Motion Compensation and Frame Rate Conversion" (assigned to the assignee of the present invention and incorporated by reference). For example, a 72 fps camera original can be utilized with motion compensated frame rate conversion to create an effective frame rate of 288 frames per second. Using M=12, both 48 fps and 24 fps frame rates can be derived, as well as other useful rates such as 144 fps, 96 fps, and 32 fps (and of course, the original 72 fps). The frame rate conversions using this method need not be integral multiples. For example, an effective rate of 120 fps can be created from a 72 fps source, and then used as a source for both 60 fps and 24 fps rates (using M=10).

Thus, there are temporal layering benefits to optimizing the performance of B frame interpolation. The proportional B frame interpolation described above make higher numbers of consecutive B frames function more efficiently, thereby enabling these benefits.

Blended B-Frame Interpolation Proportions

One reason that equal average weighting has been used in conventional systems as the motion compensated mode predictor for B frame pixel values is that the P (or I) frame before or after a particular B frame may be noisy, and therefore represent an imperfect match. Equal blending will optimize the reduction of noise in the interpolated motion-compensated block. There is a difference residual that is coded using the quantized DCT function. Of course, the better the match from the motion compensated proportion, the fewer difference residual bits will be required, and the higher the resulting image quality.

In cases where there are objects moving in and out of shadow or haze, a true proportion where M>2 provides a better prediction. However, when lighting and contrast changes are not occurring, equal weighting may prove to be a better predictor, since the errors of moving a macroblock forward along a motion vector will be averaged with the errors from the backward displaced block, thus reducing the errors in each by half. Even so, it is more likely that B frame macroblocks nearer a P (or I) frame will correlate more to that frame than to a more distant P (or I) frame.

Thus, it is desirable in some circumstances, such as regional contrast or brightness change, to utilize a true proportion for B frame macroblock pixel weighting (for both luminance and color), as described above. In other circumstances, it may be more optimal to utilize equal proportions, as in MPEG-2 and MPEG-4.

Another aspect of the invention utilizes a blend of these two proportion techniques (equal average and frame-distance proportion) for B frame pixel interpolation. For example, in the M=3 case, ¾ of the ⅓ and ⅔ proportions can be blended with ¼ of the equal average, resulting in the two proportions being ⅜ and ⅝. This technique may be generalized by using a "blend factor" F:

$$\text{Weight} = F \cdot (\text{FrameDistanceProportionalWeight}) + (1-F) \cdot (\text{EqualAverageWeight})$$

The useful range of the blend factor F is from 1, indicating purely proportional interpolation, to 0, indicating purely equal average (the reverse assignment of values may also be used).

Figure 3:
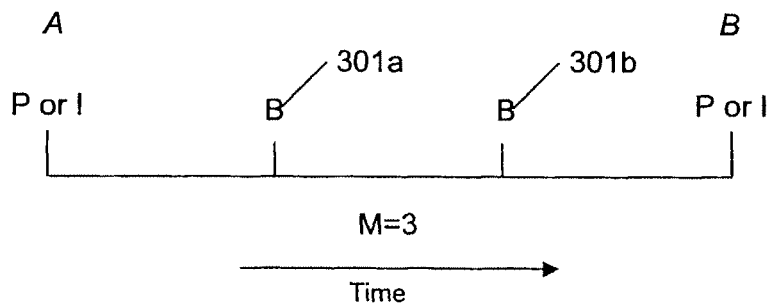
FIG. 3 is a time line of frames and blended, proportional, and equal pixel weighting values in accordance with this aspect of the invention.

FIG. 3 is a time line of frames and blended, proportional, and equal pixel weighting values in accordance with this aspect of the invention. The pixel values of each macroblock of each intermediate B frame 301a, 301b are weighted as a function of "time distance" between the previous P or I frame A and the next P or I frame B, and as a function of the equal average of A and B. In this example, for M=3 and a blend factor F=¾, the blended weighting for the first B frame 301a is equal to ⅝A+⅜B (i.e., ¾ of the proportional weighting of ⅔A+⅓B, plus ¼ of the equal average weighting of (A+B)/2). Similarly, the weighting for the second B frame 301b is equal to ⅜A+⅝B.

The value of the blend factor F can be set overall for a complete encoding, or for each group of pictures (GOP), a range of B frames, each B frame, or each region within a B frame (including, for example, as finely as for each macroblock or, in the case of MPEG-4 direct mode using a P vector in 8×8 mode, even individual 8×8 motion blocks).

In the interest of bit economy, and reflecting the fact that the blend proportion is not usually important enough to be conveyed with each macroblock, optimal use of blending should be related to the type of images being compressed. For example, for images that are fading, dissolving, or where overall lighting or contrast is gradually changing, a blend factor F near or at 1 (i.e., selecting proportional interpolation) is generally most optimal. For running images without such lighting or contrast changes, then lower blend factor values, such as ⅔, ½, or ⅓, might form a best choice, thereby preserving some of the benefits of proportional interpolation as well as some of the benefits of equal average interpolation. All blend factor values within the 0 to 1 range generally will be useful, with one particular value within this range proving optimal for any given B frame.

For wide dynamic range and wide contrast range images, the blend factor can be determined regionally, depending upon the local region characteristics. In general, however, a wide range of light and contrast recommends toward blend factor values favoring purely proportional, rather than equal average, interpolation.

An optimal blend factor is generally empirically determined, although experience with particular types of scenes can be used to create a table of blend factors by scene type. For example, a determination of image change characteristics can be used to select the blend proportion for a frame or region. Alternatively, B frames can be coded using a number of candidate blend factors (either for the whole frame, or regionally), with each then being evaluated to optimize the image quality (determined, for example, by the highest signal to noise ratio, or SNR) and for lowest bit count. These candidate evaluations can then be used to select the best value for the blend proportion. A combination of both image change characteristics and coded quality/efficiency can also be used.

B frames near the middle of a sequence of B frames, or resulting from low values of M, are not affected very much by proportional interpolation, since the computed proportions are already near the equal average. However, for higher values of M, the extreme B frame positions can be significantly affected by the choice of blend factor. Note that the blend factor can be different for these extreme positions, utilizing more of the average, than the more central positions, which gain little or no benefit from deviating from the average, since they already have high proportions of both neighboring P (or I) frames. For example, if M=5, the first and fourth B frame might use a blend factor F which blends in more of the equal average, but the second and third middle B frames may use the strict ⅖ and ⅗ equal average proportions. If the proportion-to-average blend factor varies as a function of the position of a B frame in a sequence, the varying value of the blend factor can be conveyed in the compressed bitstream or as side information to the decoder.

If a static general blend factor is required (due to lack of a method to convey the value), then the value of ⅔ is usually near optimal, and can be selected as a static value for B frame interpolation in both the encoder and decoder. For example, using F=⅔ for the blend factor, for M=3 the successive frame proportions will be $7/18 (7/18 = 2/3 * 1/3 + 1/3 * 1/2)$ and $11/18 (11/18 = 2/3 * 2/3 + 1/3 * 1/2)$.

Linear Interpolation

Video frame pixel values are generally stored in a particular representation that maps the original image information to numeric values. Such a mapping may result in a linear or non-linear representation. For example, luminance values used in compression are non-linear. The use of various forms of non-linear representation include logarithmic, exponential (to various powers), and exponential with a black correction (commonly used for video signals).

Over narrow dynamic ranges, or for interpolations of nearby regions, the non-linear representation is acceptable, since these nearby interpolations represent piece-wise linear interpolations. Thus, small variations in brightness are reasonably approximated by linear interpolation. However, for wide variations in brightness, such as occur in wide dynamic range and wide contrast range images, the treatment of non-linear signals as linear will be inaccurate. Even for normal contrast range images, linear fades and cross-dissolves can be degraded by a linear interpolation. Some fades and cross-dissolves utilize non-linear fade and dissolve rates, adding further complexity.

Thus, an additional improvement to the use of proportional blends, or even simple proportional or equal average interpolations, is to perform such interpolations on pixel values represented in a linear space, or in other optimized non-linear spaces differing from the original non-linear luminance representation.

This may be accomplished, for example, by first converting the two non-linear luminance signals (from the previous and subsequent P (or I) frames into a linear representation, or a differing non-linear representation. Then a proportional blend is applied, after which the inverse conversion is applied, yielding the blended result in the image's original non-linear luminance representation. However, the proportion function will have been performed on a more optimal representation of the luminance signals.

It is also useful to beneficially apply this linear or non-linear conversion to color (chroma) values, in addition to luminance, when colors are fading or becoming more saturated, as occurs in contrast changes associated with variations in haze and overcast.

Example Embodiment

Figure 4:
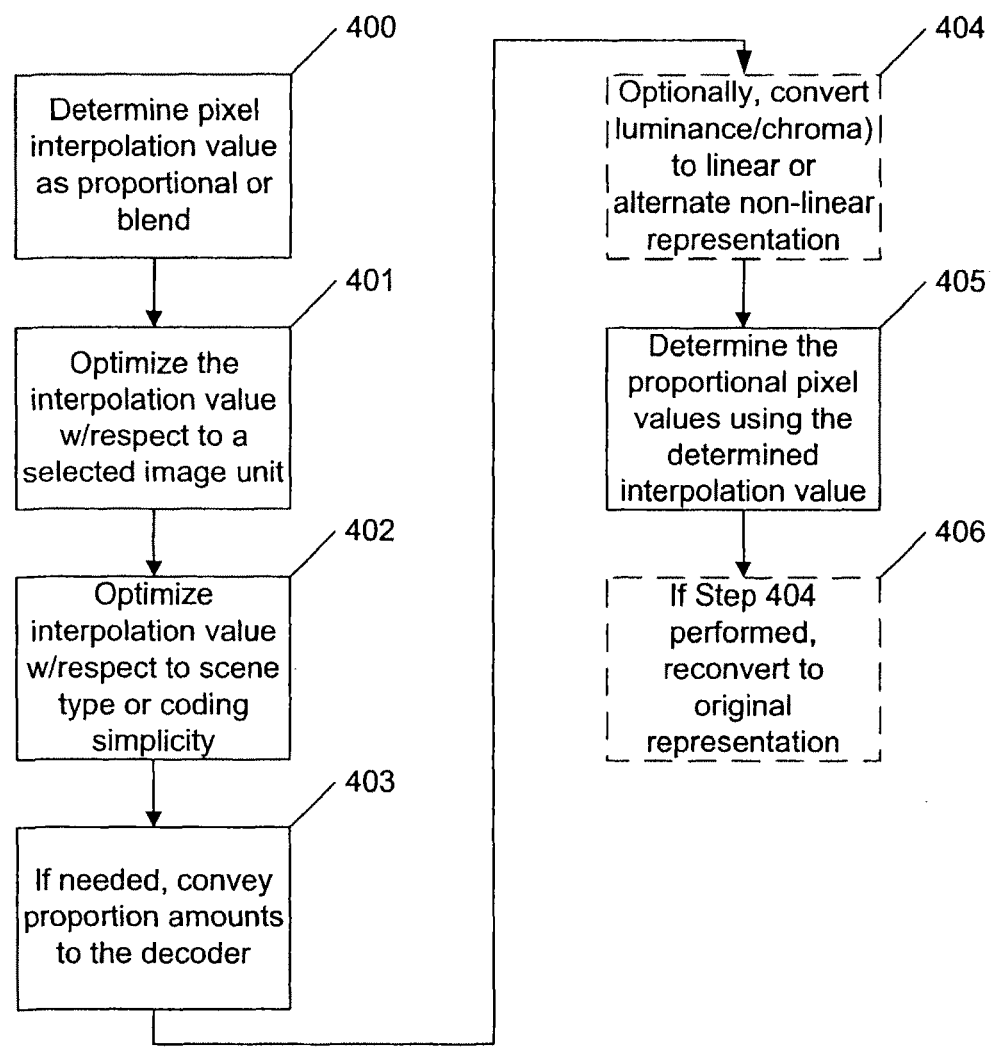
FIG. 4 is a flowchart showing an illustrative embodiment of the invention as a method that may be computer implemented.

FIG. 4 is a flowchart showing an illustrative embodiment of the invention as a method that may be computer implemented:

Step 400: In a video image compression system, for direct and interpolative mode for computing B frames, determine an interpolation value to apply to each pixel of an input sequence of two or more bi-directionally predicted intermediate frames using one of (1) the frame-distance proportion or (2) a blend of equal weighting and the frame-distance proportion, derived from at least two non-bidirectionally predicted frames bracketing such sequence input from a source (e.g., a video image stream).

Step 401: Optimize the interpolation value with respect to an image unit (e.g., a group of pictures (GOP), a sequence of frames, a scene, a frame, a region within a frame, a macroblock, a DCT block, or similar useful grouping or selection of pixels). The interpolation value may be set statically for the entire encoding session, or dynamically for each image unit.

Step 402: Further optimize the interpolation value with respect to scene type or coding simplicity. For example, an interpolation value may be set: statically (such as ⅔ proportional and ⅓ equal average); proportionally for frames near the equal average, but blended with equal average near the adjacent P (or I) frames; dynamically based upon overall scene characteristics, such as fades and cross dissolves; dynamically (and locally) based on local image region characteristics, such as local contrast and local dynamic range; or dynamically (and locally) based upon coding performance (such as highest coded SNR) and minimum coded bits generated.

Step 403: Convey the appropriate proportion amounts to the decoder, if not statically determined.

Step 404: Optionally, convert the luminance (and, optionally, chroma) information for each frame to a linear or alternate non-linear representation, and convey this alternate representation to the decoder, if not statically determined.

Step 405: Determine the proportional pixel values using the determined interpolation value.

Step 406: If necessary (because of Step 404), reconvert to the original representation.

Extended P Frame Reference

As noted above, in prior art MPEG-1, 2, and 4 compression methods, P frames reference the previous P or I frame, and B frames reference the nearest previous and subsequent P and/or I frames. The same technique is used in the H.261 and H.263 motion-compensated DCT compression standards, which encompass low bit rate compression techniques.

In the H.263++ and H.26L standard in development, B frame referencing was extended to point to P or I frames which were not directly bracketing a current frame. That is, macro blocks within B frames could point to one P or I frame before the previous P frame, or to one P or I frame after the subsequent P frame. With one or more bits per macroblock, skipping of the previous or subsequent P frame can be signaled simply. Conceptually, the use of previous P frames for reference in B frames only requires storage. For the low-bit rate-coding use of H.263++ or H.26L, this is a small amount of additional memory. For subsequent P frame reference, the P frame coding order must be modified with respect to B frame coding, such that future P frames (or possibly I frames) must be decoded before intervening B frames. Thus, coding order is also an issue for subsequent P frame references.

The primary distinctions between P and B frame types are: (1) B frames may be bi-directionally referenced (up to two motion vectors per macroblock); (2) B frames are discarded after use (which also means that they can be skipped during decoding to provide temporal layering); and (3) P frames are used as "stepping stones", one to the next, since each P frame must be decoded for use as a reference for each subsequent P frame.

Figure 5:
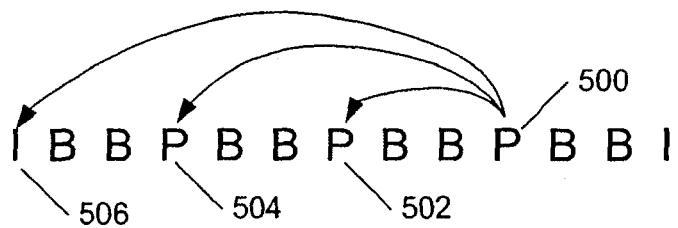
FIG. 5 is a diagram showing an example of multiple previous references by a current P frame to two prior P frames, and to a prior I frame.

As another aspect of the invention, P frames (as opposed to B frames) are decoded with reference to one or more previous P or I frames (excluding the case of each P frame referencing only the nearest previous P or I frame). Thus, for example, two or more motion vectors per macroblock may be used for a current P frame, all pointing backward in time (i.e., to one or more previously decoded frames). Such P frames still maintain a "stepping stone" character. FIG. 5 is a diagram showing an example of multiple previous references by a current P frame 500 to two prior P frames 502, 504, and to a prior I frame 506.

Further, it is possible to apply the concepts of macroblock interpolation, as described above, in such P frame references. Thus, in addition to signaling single references to more than one previous P or I frame, it is also possible to blend proportions of multiple previous P or I frames, using one motion vector for each such frame reference. For example, the technique described above of using a B frame interpolation mode having two frame references may be applied to allow any macroblock in a P frame to reference two previous P frames or one previous P frame and one previous I frame, using two motion vectors. This technique interpolates between two motion vectors, but is not bi-directional in time (as is the case with B frame interpolation), since both motion vectors point backward in time. Memory costs have decreased to the point where holding multiple previous P or I frames in memory for such concurrent reference is quite practical.

In applying such P frame interpolation, it is constructive to select and signal to a decoder various useful proportions of the previous two or more P frames (and, optionally, one prior I frame). In particular, an equal blend of frames is one of the useful blend proportions. For example, with two previous P frames as references, an equal ½ amount of each P frame can be blended. For three previous P frames, a ⅓ equal blend could be used.

Another useful blend of two P frames is ⅔ of the most recent previous frame, and ⅓ of the least recent previous frame. For three previous P frames, another useful blend is ½ of the most recent previous frame, ⅓ of the next most recent previous frame, and ⅙ of the least recent previous frame.

In any case, a simple set of useful blends of multiple previous P frames (and, optionally, one I frame) can be utilized and signaled simply from an encoder to a decoder. The specific blend proportions utilized can be selected as often as useful to optimize coding efficiency for an image unit. A number of blend proportions can be selected using a small number of bits, which can be conveyed to the decoder whenever suitable for a desired image unit.

As another aspect of the invention, it is also useful to switch-select single P frame references from the most recent previous P (or I) frame to a more "distant" previous P (or I) frame. In this way, P frames would utilize a single motion vector per macroblock (or, optionally, per 8×8 block in MPEG-4 style coding), but would utilize one or more bits to indicate that the reference refers to a single specific previous frame. P frame macroblocks in this mode would not be interpolative, but instead would reference a selected previous frame, being selected from a possible two, three, or more previous P (or I) frame choices for reference. For example, a 2-bit code could designate one of up to four previous frames as the single reference frame of choice. This 2-bit code could be changed at any convenient image unit.

Adaptive Number of B Frames

Figure 6A:
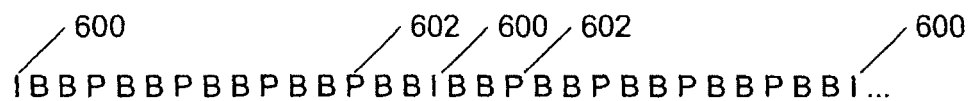
FIG. 6A is a diagram of a typical prior art MPEG-2 coding pattern, showing a constant number of B frames between bracketing I frames and/or P frames.

It is typical in MPEG coding to use a fixed pattern of I, P, and B frame types. The number of B frames between P frames is typically a constant. For example, it is typical in MPEG-2 coding to use two B frames between P (or I) frames. FIG. 6A is a diagram of a typical prior art MPEG-2 coding pattern, showing a constant number of B frames (i.e., two) between bracketing I frames 600 and/or P frames 602.

Figure 6B:
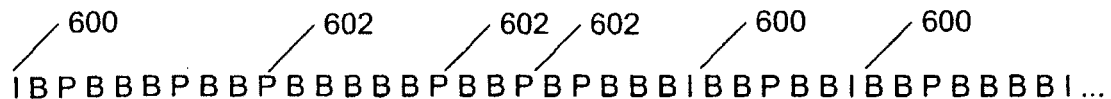
FIG. 6B is a diagram of a theoretically possible prior art MPEG-4 video coding pattern, showing a varying number of B frames between bracketing I frames and/or P frames, as well as a varying distance between I frames.

The MPEG-4 video coding standard conceptually allows a varying number of B frames between bracketing I frames and/or P frames, and a varying amount of distance between I frames. FIG. 6B is a diagram of a theoretically possible prior art MPEG-4 video coding pattern, showing a varying number of B frames between bracketing I frames 600 and/or P frames 602, as well as a varying distance between I frames 600.

This flexible coding structure theoretically can be utilized to improve coding efficiency by matching the most effective B and P frame coding types to the moving image frames. While this flexibility has been specifically allowed, it has been explored very little, and no mechanism is known for actually determining the placement of B and P frames in such a flexible structure.

Another aspect of the invention applies the concepts described herein to this flexible coding structure as well as to the simple fixed coding patterns in common use. B frames thus can be interpolated using the methods described above, while P frames may reference more than one previous P or I frame and be interpolated in accordance with the present description.

In particular, macroblocks within B frames can utilize proportional blends appropriate for a flexible coding structure as effectively as with a fixed structure. Proportional blends can also be utilized when B frames reference P or I frames that are further away than the nearest bracketing P or I frames.

Similarly, P frames can reference more than one previous P or I frame in this flexible coding structure as effectively as with a fixed pattern structure. Further, blend proportions can be applied to macroblocks in such P frames when they reference more than one previous P frame (plus, optionally, one I frame).

(A) Determining Placement in Flexible Coding Patterns

Figure 7:
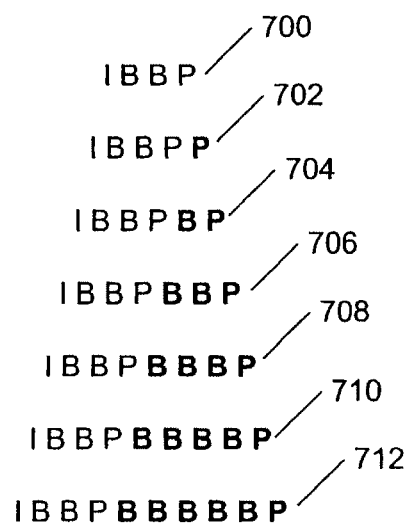
FIG. 7 is a diagram of code patterns.

The following method allows an encoder to optimize the efficiency of both the frame coding pattern as well as the blend proportions utilized. For a selected range of frames, a number of candidate coding patterns can be tried, to determine an optimal or near optimal (relative to specified criteria) pattern. FIG. 7 is a diagram of code patterns that can be examined. An initial sequence 700, ending in a P or I frame, is arbitrarily selected, and is used as a base for adding additional P and/or B frames, which are then evaluated (as described below). In one embodiment, a P frame is added to the initial sequence 700 to create a first test sequence 702 for evaluation. If the evaluation is satisfactory, an intervening B frame is inserted to create a second test sequence 704. For each satisfactory evaluation, additional B frames are inserted to create increasingly longer test sequences 706-712, until the evaluation criteria become unsatisfactory. At that point, the previous coding sequence is accepted. This process is then repeated, using the end P frame for the previously accepted coding sequence as the starting point for adding a new P frame and then inserting new B frames.

An optimal or near optimal coding pattern can be selected based upon various evaluation criteria, often involving tradeoffs of various coding characteristics, such as coded image quality versus number of coding bits required. Common evaluation criteria include the least number of bits used (in a fixed quantization parameter test), or the best signal-to-noise-ratio (in a fixed bit-rate test), or a combination of both.

It is also common to minimize a sum-of-absolute-difference (SAD), which forms a measure of DC match. As described in co-pending U.S. patent Ser. No. 09/904,192, entitled "Motion Estimation for Video Compression Systems" (assigned to the assignee of the present invention and hereby incorporated by reference), an AC match criterion is also a useful measure of the quality of a particular candidate match (the patent application also describes other useful optimizations). Thus, the AC and DC match criteria, accumulated over the best matches of all macroblocks, can be examined to determine the overall match quality of each candidate coding pattern. This AC/DC match technique can augment or replace the signal-to-noise ratio (SNR) and least-bits-used tests when used together with an estimate of the number of coded bits for each frame pattern type. It is typical to code macroblocks within B frames with a higher quantization parameter (QP) value than for P frames, affecting both the quality (measured often as a signal-to-noise ratio) and the number of bits used within the various candidate coding patterns.

(B) Blend Proportion Optimization in Flexible Coding Patterns

Optionally, for each candidate pattern determined in accordance with the above method, blend proportions may be tested for suitability (e.g., optimal or near optimal blend proportions) relative to one or more criteria. This can be done, for example, by testing for best quality (lowest SNR) and/or efficiency (least bits used). The use of one or more previous references for each macroblock in P frames can also be determined in the same way, testing each candidate reference pattern and blend proportion, to determine a set of one or more suitable references.

Once the coding pattern for this next step (Step 700 in FIG. 7) has been selected, then the subsequent steps (Steps 702-712) can be tested for various candidate coding patterns. In this way, a more efficient coding of a moving image sequence can be determined. Thus, efficiency can be optimized/improved as described in subsection (A) above; blend optimization can be applied at each tested coding step.

DC vs. AC Interpolation

Figure 8:
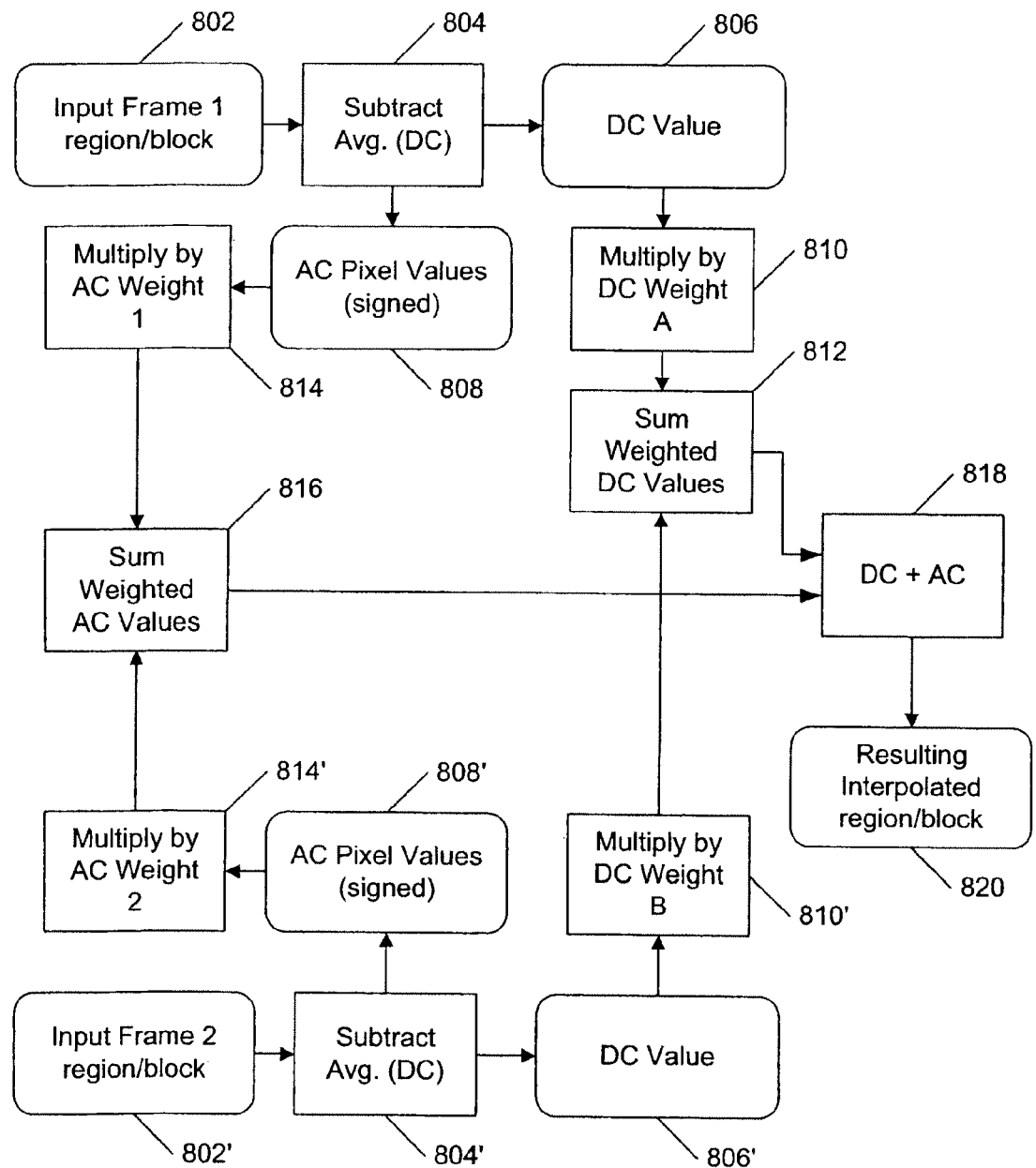
FIG. 8 is a flowchart showing one embodiment of an interpolation method with DC interpolation being distinct from AC interpolation.

In many cases of image coding, such as when using a logarithmic representation of image frames, the above-described interpolation of frame pixel values will optimally code changes in illumination. However, in alternative video "gamma-curve", linear, and other representations, it will often prove useful to apply different interpolation blend factors to the DC values than to the AC values of the pixels. FIG. 8 is a flowchart showing one embodiment of an interpolation method with DC interpolation being distinct from AC interpolation. For a selected image region (usually a DCT block or macroblock) from a first and second input frame 802, 802', the average pixel value for each such region is subtracted 804, 804', thereby separating the DC value (i.e., the average value of the entire selected region) 806, 806' from the AC values (i.e., the signed pixel values remaining) 808, 808' in the selected regions. The respective DC values 806, 806' can then be multiplied by interpolation weightings 810, 810' different from the interpolation weightings 814, 814' used to multiply the AC (signed) pixel values 808, 808'. The newly interpolated DC value 812 and the newly interpolated AC values 816 can then be combined 818, resulting in a new prediction 820 for the selected region.

As with the other interpolation values in this invention, the appropriate weightings can be signaled to a decoder per image unit. A small number of bits can select between a number of interpolation values, as well as selecting the independent interpolation of the AC versus DC aspects of the pixel values.

Linear & Non-Linear Interpolation

Interpolation is a linear weighted average. Since the interpolation operation is linear, and since the pixel values in each image frame are often represented in a non-linear form (such as video gamma or logarithmic representations), further optimization of the interpolation process becomes possible. For example, interpolation of pixels for a particular sequence of frames, as well as interpolation of DC values separately from AC values, will sometimes be optimal or near optimal with a linear pixel representation. However, for other frame sequences, such interpolation will be optimal or near optimal if the pixels are represented as logarithmic values or in other pixel representations. Further, the optimal or near optimal representations for interpolating U and V (chroma) signal components may differ from the optimal or near optimal representations for the Y (luminance) signal component. It is therefore a useful aspect of the invention to convert a pixel representation to an alternate representation as part of the interpolation procedure.

Figure 9:
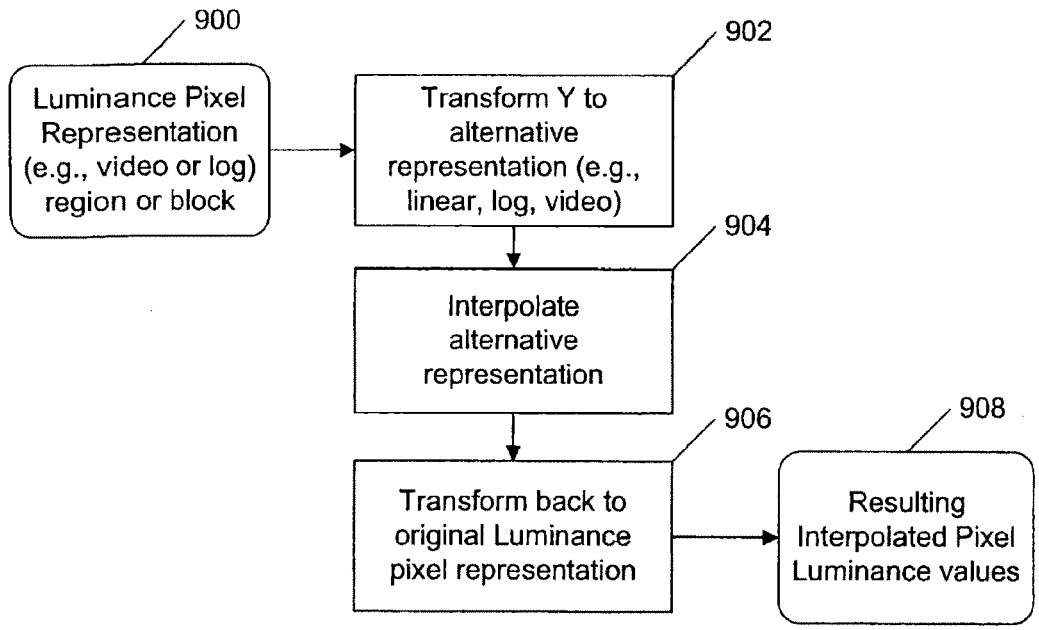
FIG. 9 is a flowchart showing one embodiment of a method for interpolation of luminance pixels using an alternative representation.

FIG. 9 is a flowchart showing one embodiment of a method for interpolation of luminance pixels using an alternative representation. Starting with a region or block of luminance (Y) pixels in an initial representation (e.g., video gamma or logarithmic) (Step 900), the pixel data is transformed to an alternative representation (e.g., linear, logarithmic, video gamma) different from the initial representation (Step 902). The transformed pixel region or block is then interpolated as described above (Step 906), and transformed back to the initial representation (Step 906). The result is interpolated pixel luminance values (Step 908).

Figure 10:
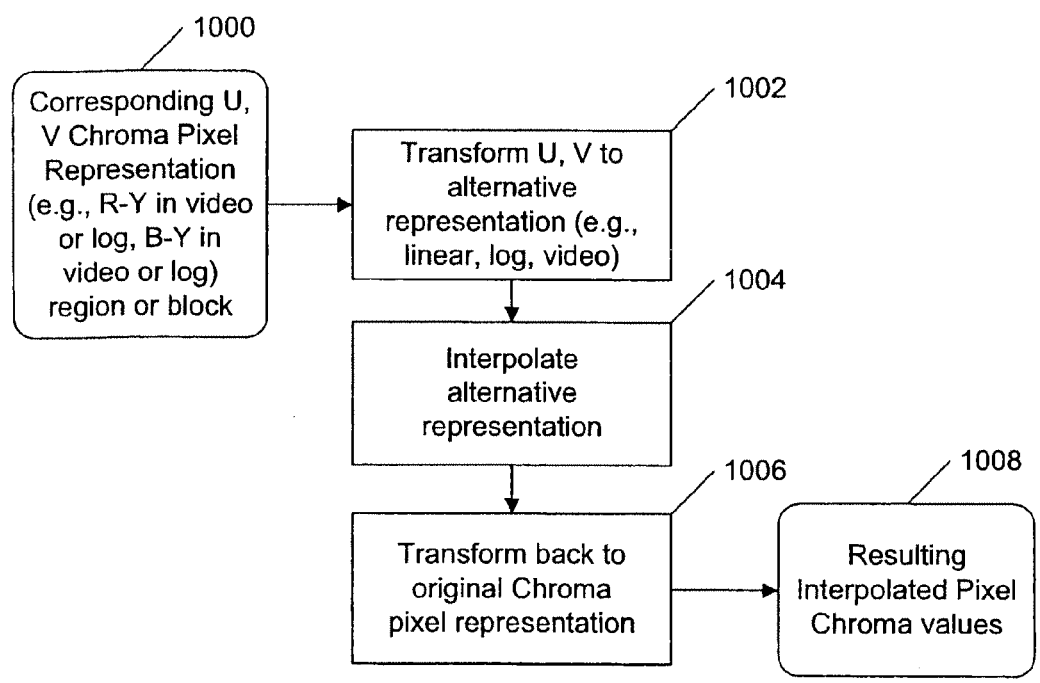
FIG. 10 is a flowchart showing one embodiment of a method for interpolation of chroma pixels using an alternative representation.

FIG. 10 is a flowchart showing one embodiment of a method for interpolation of chroma pixels using an alternative representation. Starting with a region or block of chroma (U, V) pixels in an initial representation (e.g., video gamma or logarithmic) (Step 1000), the pixel data is transformed to an alternative representation (e.g., linear, logarithmic, video gamma) different from the initial representation (Step 1002). The transformed pixel region or block is then interpolated as described above (Step 1006), and transformed back to the initial representation (Step 1006). The result is interpolated pixel chroma values (Step 1008).

The transformations between representations may be performed in accordance with the teachings of U.S. patent application Ser. No. 09/905,039, entitled "Method and System for Improving Compressed Image Chroma Information", assigned to the assignee of the present invention and hereby incorporated by reference. Note that the alternative representation transformation and its inverse can often be performed using a simple lookup table.

As a variation of this aspect of the invention, the alternative (linear or non-linear) representation space for AC interpolation may differ from the alternative representation space for DC interpolation.

As with the interpolation weightings, the selection of which alternate interpolation representation is to be used for each of the luminance (Y) and chroma (U and V) pixel representations may be signaled to the decoder using a small number of bits for each selected image unit.

Number of Motion Vectors per Macroblock

In MPEG-2, one motion vector is allowed per 16×16 macroblock in P frames. In B frames, MPEG-2 allows a maximum of 2 motion vectors per 16×16 macroblock, corresponding to the bi-directional interpolative mode. In MPEG-4 video coding, up to 4 motion vectors are allowed per 16×16 macroblock in P frames, corresponding to one motion vector per 8×8 DCT block. In MPEG-4 B frames, a maximum of two motion vectors are allowed for each 16×16 macroblock, when using interpolative mode. A single motion vector delta in MPEG-4 direct mode can result in four independent "implicit" motion vectors, if the subsequent corresponding P frame macroblock was set in 8×8 mode having four vectors. This is achieved by adding the one motion vector delta carried in a 16×16 B frame macroblock to each of the corresponding four independent motion vectors from the following P frame macroblock, after scaling for the distance in time (the B frame is closer in time than the P frame's previous P or I frame reference).

One aspect of the invention includes the option to increase the number of motion vectors per picture region, such as a macroblock. For example, it will sometimes prove beneficial to have more than two motion vectors per B frame macroblock. These can be applied by referencing additional P or I frames and having three or more interpolation terms in the weighted sum. Additional motion vectors can also be applied to allow independent vectors for the 8×8 DCT blocks of the B frame macroblock. Also, four independent deltas can be used to extend the direct mode concept by applying a separate delta to each of the four 8×8-region motion vectors from the subsequent P frame.

Further, P frames can be adapted using B-frame implementation techniques to reference more than one previous frame in an interpolative mode, using the B-frame two-interpolation-term technique described above. This technique can readily be extended to more than two previous P or I frames, with a resulting interpolation having three or more terms in the weighted sum.

As with other aspects of this invention (e.g., pixel representation and DC versus AC interpolation methods), particular weighted sums can be communicated to a decoder using a small number of bits per image unit.

In applying this aspect of the invention, the correspondence between 8×8 pixel DCT blocks and the motion vector field need not be as strict as with MPEG-2 and MPEG-4. For example, it may be useful to use alternative region sizes other than 16×16, 16×8 (used only with interlace in MPEG-4), and 8×8 for motion vectors. Such alternatives might include any number of useful region sizes, such as 4×8, 8×12, 8×16, 6×12, 2×8, 4×8, 24×8, 32×32, 24×24, 24×16, 8×24, 32×8, 32×4, etc. Using a small number of such useful sizes, a few bits can signal to a decoder the correspondence between motion vectors region sizes and DCT block sizes. In systems where a conventional 8×8 DCT block is used, a simple set of correspondences to the motion vector field are useful to simplify processing during motion compensation. In systems where the DCT block size is different from 8×8, then greater flexibility can be achieved in specifying the motion vector field, as described in co-pending U.S. patent application Ser. No. 09/545,233, entitled "Enhanced Temporal and Resolution Layering in Advanced Television", assigned to the assignee of the present invention and hereby incorporated by reference. Note that motion vector region boundaries need not correspond to DCT region boundaries. Indeed, it is often useful to define motion vector regions in such a way that a motion vector region edge falls within a DCT block (and not at its edge).

The concept of extending the flexibility of the motion vector field also applies to the interpolation aspect of this invention. As long as the correspondence between each pixel and one or more motion vectors to one or more reference frames is specified, the interpolation method described above can be applied to the full flexibility of useful motion vectors using all of the generality of this invention. Even the size of the regions corresponding to each motion vector can differ for each previous frame reference when using P frames, and each previous and future frame reference when using B frames. If the region sizes for motion vectors differ when applying the improved interpolation method of this invention, then the interpolation reflects the common region of overlap. The common region of overlap for motion vector references can be utilized as the region over which the DC term is determined when separately interpolating DC and AC pixel values.

Figure 11:
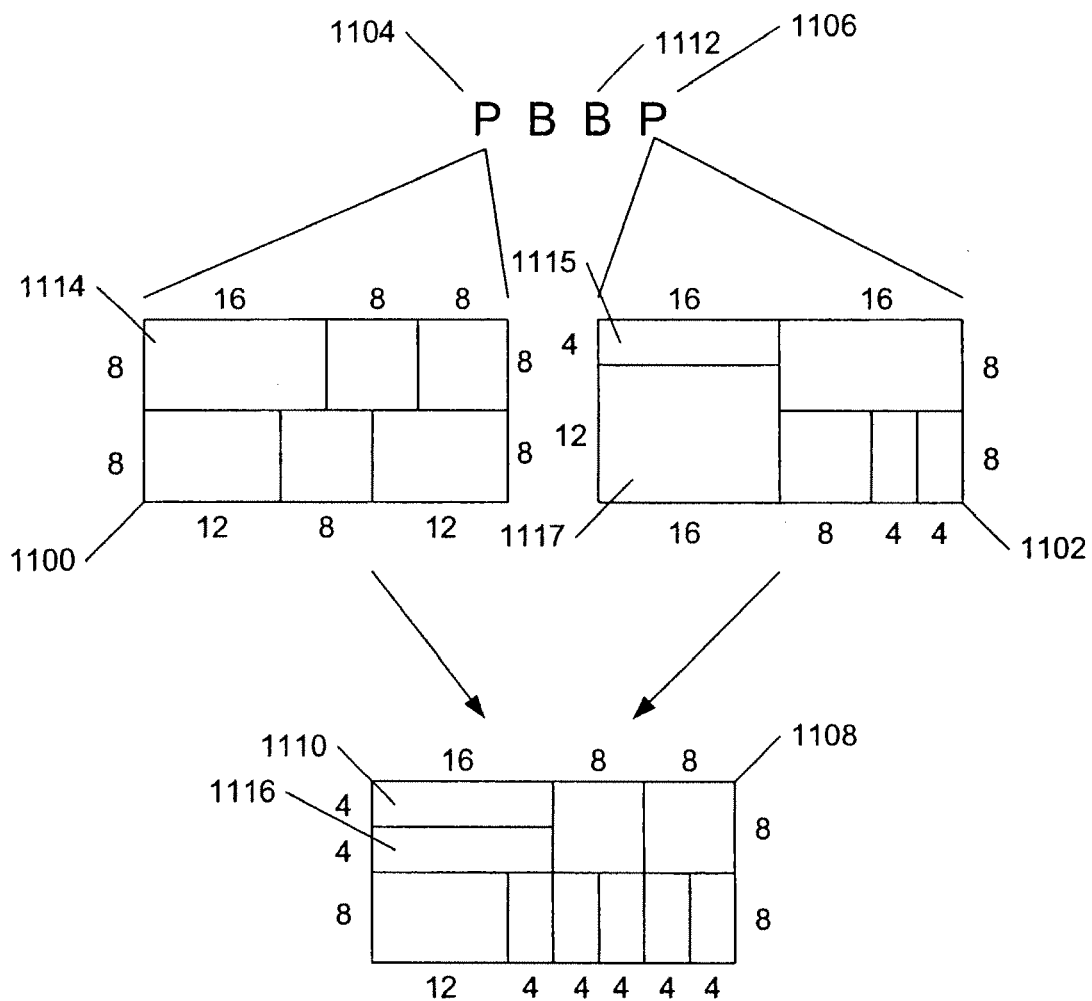
FIG. 11 is a diagram showing unique motion vector region sizes for each of two P frames.

FIG. 11 is a diagram showing unique motion vector region sizes 1100, 1102 for each of two P frames 1104, 1106. Before computing interpolation values in accordance with this invention, the union 1108 of the motion vector region sizes is determined. The union 1108 defines all of the regions which are considered to have an assigned motion vector.

Thus, for example, in interpolating 4×4 DCT regions of a B frame 1112 backwards to the prior P frame 1104, a 4×4 region 1110 within the union 1108 would use the motion vector corresponding to the 8×16 region 1114 in the prior P frame. If predicting forward, the region 1110 within the union 1108 would use the motion vector corresponding to the 4×16 region 1115 in the next P frame. Similarly, interpolation of the region 116 within the union 1108 backwards would use the motion vector corresponding to the 8×16 region 1114, while predicting the same region forward would use the motion vector corresponding to the 12×16 region 1117.

In one embodiment of the invention, two steps are used to accomplish the interpolation of generalized (i.e., non-uniform size) motion vectors. The first step is to determine the motion vector common regions, as described with respect to FIG. 11. This establishes the correspondence between pixels and motion vectors (i.e., the number of motion vectors per specified pixel region size) for each previous or subsequent frame reference. The second step is to utilize the appropriate interpolation method and interpolation factors active for each region of pixels. It is a task of the encoder to ensure that optimal or near optimal motion vector regions and interpolation methods are specified, and that all pixels have their vectors and interpolation methods completely specified. This can be very simple in the case of a fixed pattern of motion vectors (such as one motion vector for each 32×8 block, specified for an entire frame), with a single specified interpolation method (such as a fixed proportion blend to each distance of referenced frame, specified for the entire frame). This method can also become quite complex if regional changes are made to the motion vector region sizes, and where the region sizes differ depending upon which previous or subsequent frame is referenced (e.g., 8×8 blocks for the nearest previous frame, and 32×8 blocks for the next nearest previous frame). Further, the interpolation method may be regionally specified within the frame.

When encoding, it is the job of the encoder to determine the optimal or near optimal use of the bits to select between motion vector region shapes and sizes, and to select the optimal or near optimal interpolation method. A determination is also required to specify the number and distance of the frames referenced. These specifications can be determined by exhaustive testing of a number of candidate motion vector region sizes, candidate frames to reference, and interpolation methods for each such motion vector region, until an optimal or near optimal coding is found. Optimality (relative to a selected criteria) can be determined by finding the least SNR after encoding a block or the lowest number of bits for a fixed quantization parameter (QP) after coding the block, or by application of another suitable measure.

Direct Mode Extension

Conventional direct mode, used in B frame macroblocks in MPEG-4, can be efficient in motion vector coding, providing the benefits of 8×8 block mode with a simple common delta. Direct mode weights each corresponding motion vector from the subsequent P frame, which references the previous P frame, at the corresponding macroblock location based upon distance in time. For example, if M=3 (i.e., two intervening B frames), with simple linear interpolation the first B frame would use −⅔ times the subsequent P frame motion vector to determine a pixel offset with respect to such P frame, and ⅓ times the subsequent P frame motion vector to determine a pixel offset with respect to the previous P frame. Similarly, the second B frame would use −⅓ times the same P frame motion vector to determine a pixel offset with respect to such P frame, and ⅔ times the subsequent P frame motion vector to determine a pixel offset with respect to the previous P frame. In direct mode, a small delta is added to each corresponding motion vector. As another aspect of this invention, this concept can be extended to B frame references which point to one or more n-away P frames, which in turn reference one or more previous or subsequent P frames or I frames, by taking the frame distance into account to determine a frame scale fraction.

Figure 12:
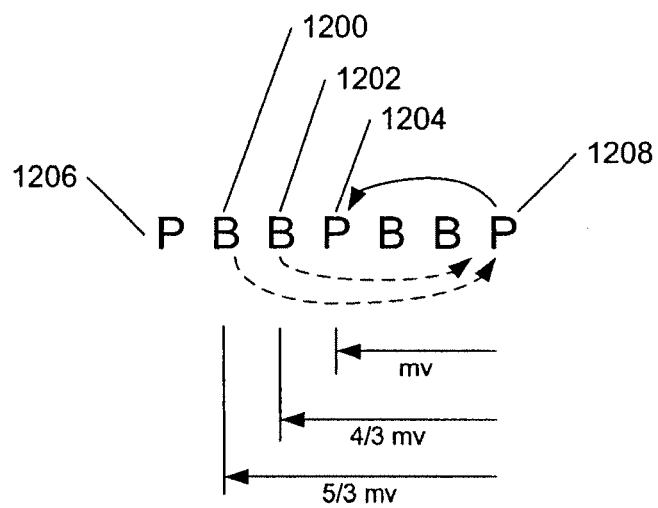
FIG. 12 is a diagram showing a sequence of P and B frames with interpolation weights for the B frames determined as a function of distance from a 2-away subsequent P frame that references a 1-away subsequent P frame.

FIG. 12 is a diagram showing a sequence of P and B frames with interpolation weights for the B frames determined as a function of distance from a 2-away subsequent P frame that references a 1-away subsequent P frame. In the illustrated example, M=3, indicating two consecutive B frames 1200, 1202 between bracketing P frames 1204, 1206. In this example, each co-located macroblock in the next nearest subsequent P frame 1208 (i.e., n=2) might point to the intervening (i.e., nearest) P frame 1204, and the first two B frames 1200, 1202 may reference the next nearest subsequent P frame 1208 rather than the nearest subsequent P frame 1204, as in conventional MPEG. Thus, for the first B frame 1200, the frame scale fraction ⅗ times the motion vector my from the next nearest subsequent P frame 1208 would be used as a pixel offset with respect to P frame 1208, and the second B frame 1202 would use an offset of ⅘ times that same motion vector.

Figure 13:
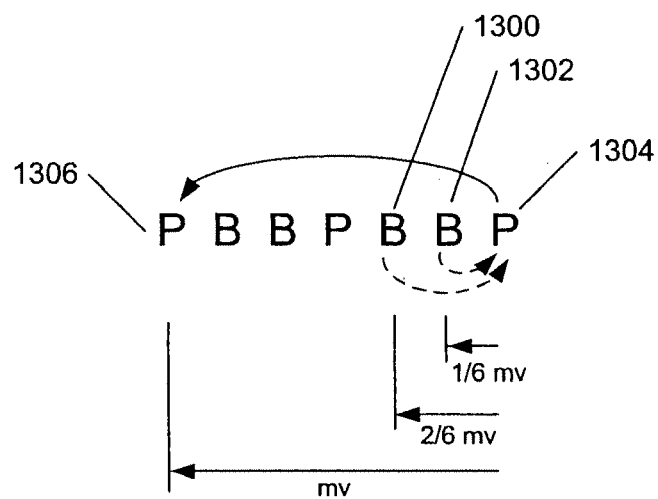
FIG. 13 is a diagram showing a sequence of P and B frames with interpolation weights for the B frames determined as a function of distance from a 1-away subsequent P frame that references a 2-away previous P frame.

If a nearest subsequent P frame referenced by a B frame points to the next nearest previous P frame, then again the simple frame distance can be used to obtain the suitable frame scale fraction to apply to the motion vectors. FIG. 13 is a diagram showing a sequence of P and B frames with interpolation weights for the B frames determined as a function of distance from a 1-away subsequent P frame that references a 2-away previous P frame. In the illustrated example, M=3, and B frames 1300, 1302 reference the nearest subsequent P frame 1304, which in turn references the 2-away P frame 1306. Thus, for the first B frame 1300, the pixel offset fraction is the frame scale fraction ⅖ multiplied by the motion vector my from the nearest subsequent P frame 1304, and the second B frame 1302 would have a pixel offset of the frame scale fraction ⅙ multiplied by that same motion vector, since the motion vector of the nearest subsequent P frame 1304 points to the 2-away previous P frame 1306, which is 6 frames distant.

In general, in the case of a B frame referencing a single P frame in direct mode, the frame distance method sets the numerator of a frame scale fraction equal to the frame distance from that B frame to its referenced, or "target", P frame, and sets the denominator equal to the frame distance from the target P frame to another P frame referenced by the target P frame. The sign of the frame scale fraction is negative for measurements made from a B frame to a subsequent P frame, and positive for measurements made from a B frame to a prior P frame. This simple method of applying a frame-distance or the frame scale fraction to a P frame motion vector can achieve an effective direct mode coding.

Further, another aspect of this invention is to allow direct mode to apply to multiple interpolated motion vector references of a P frame. For example, if a P frame was interpolated from the nearest and next nearest previous P frames, direct mode reference in accordance with this aspect of the invention allows an interpolated blend for each multiple reference direct mode B frame macroblock. In general, the two or more motion vectors of a P frame can have an appropriate frame scale fraction applied. The two or more frame-distance modified motion vectors then can be used with corresponding interpolation weights for each B frame referencing or targeting that P frame, as described below, to generate interpolated B frame macroblock motion compensation.

Figure 14:
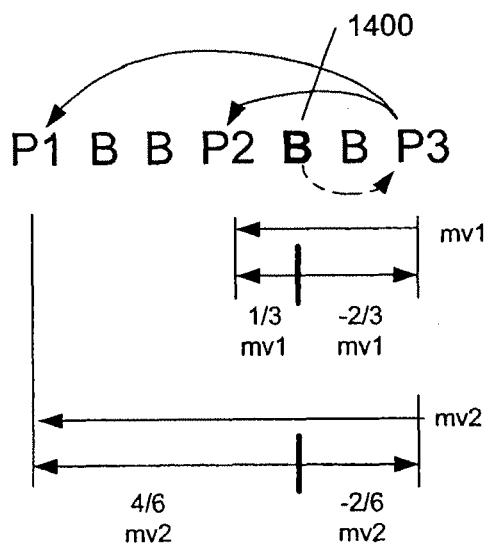
FIG. 14 is a diagram showing a sequence of P and B frames in which a subsequent P frame has multiple motion vectors referencing prior P frames.

FIG. 14 is a diagram showing a sequence of P and B frames in which a subsequent P frame has multiple motion vectors referencing prior P frames. In this example, a B frame 1400 references a subsequent P frame P3. This P3 frame in turn has two motion vectors, mv1 and mv2, that reference corresponding prior P frames P2, P1. In this example, each macroblock of the B frame 1400 can be interpolated in direct mode using either of two weighting terms or a combination of such weighing terms.

Each macroblock for the B frame 1400 would be constructed as a blend from:
corresponding pixels of frame P2 displaced by the frame scale fraction ⅓ of mv1 (where the pixels may then be multiplied by some proportional weight i) plus corresponding pixels of frame P3 displaced by the frame scale fraction −⅔ of mv1 (where the pixels may then be multiplied by some proportional weight j); and
corresponding pixels of frame P1 displaced by the frame scale fraction ⅔ (4/6) of mv2 (where the pixels may then be multiplied by some proportional weight k) plus corresponding pixels of frame P3 displaced by the frame scale fraction −⅓ (−2/6) of mv2 (where the pixels may then be multiplied by some proportional weight 1).

As with all direct modes, a motion vector delta can be utilized with each of mv1 and mv2.

Figure 15:
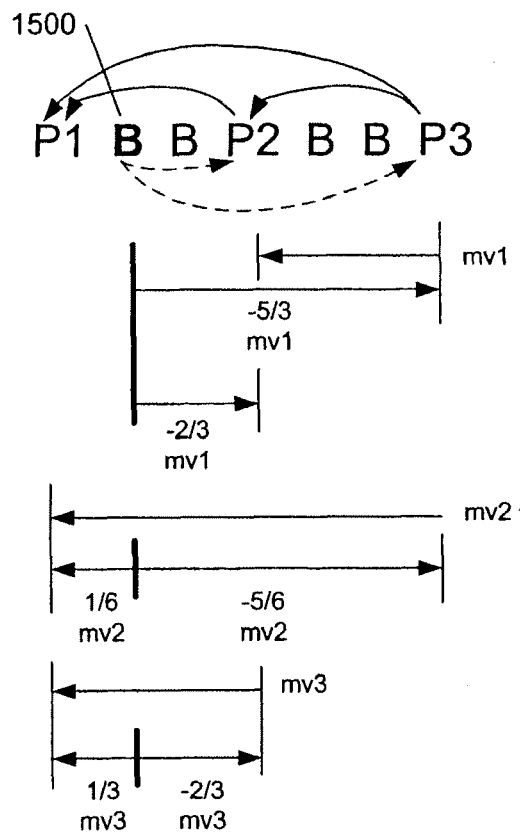
FIG. 15 is a diagram showing a sequence of P and B frames in which a nearest subsequent P frame has a motion vector referencing a prior P frame, and a next nearest subsequent P frame has multiple motion vectors referencing prior P frames.

In accordance with this aspect of the invention, direct mode predicted macroblocks in B frames can also reference multiple subsequent P frames, using the same methodology of interpolation and motion vector frame scale fraction application as with multiple previous P frames. FIG. 15 is a diagram showing a sequence of P and B frames in which a nearest subsequent P frame has a motion vector referencing a prior P frame, and a next nearest subsequent P frame has multiple motion vectors referencing prior P frames. In this example, a B frame 1500 references two subsequent P frames P2, P3. The P3 frame has two motion vectors, mv1 and mv2, that reference corresponding prior P frames P2, P1. The P2 frame has one motion vector, mv3, which references the prior P frame P1. In this example, each macroblock of the B frame 1500 is interpolated in direct mode using three weighting terms. In this case, the motion vector frame scale fractions may be greater than 1 or less than −1.

The weightings for this form of direct mode B frame macroblock interpolation can utilize the full generality of interpolation as described herein. In particular, each weight, or combinations of the weights, can be tested for best performance (e.g., quality versus number of bits) for various image units. The interpolation fraction set for this improved direct mode can be specified to a decoder with a small number of bits per image unit.

Each macroblock for the B frame 1500 would be constructed as a blend from:
  corresponding pixels of frame P3 displaced by the frame scale fraction $-5/3$ of mv1 (where the pixels may then be multiplied by some proportional weight i) plus corresponding pixels of frame P2 displaced by the frame scale fraction $-2/3$ of mv1 (where the pixels may then be multiplied by some proportional weight j);
  corresponding pixels of frame P3 displaced by the frame scale fraction $-5/6$ of mv2 (where the pixels may then be multiplied by some proportional weight k) plus corresponding pixels of frame P1 displaced by the frame scale fraction $1/6$ of mv2 (where the pixels may then be multiplied by some proportional weight l); and
  corresponding pixels of frame P2 displaced by the frame scale fraction $-2/3$ of mv3 (where the pixels may then be multiplied by some proportional weight m) plus corresponding pixels of frame P1 displaced by the frame scale fraction $1/3$ of mv3 (where the pixels may then be multiplied by some proportional weight n).

As with all direct modes, a motion vector delta can be utilized with each of mv1, mv2, and mv3.

Note that a particularly beneficial direct coding mode often occurs when the next nearest subsequent P frame references the nearest P frames bracketing a candidate B frame.

Figure 16:
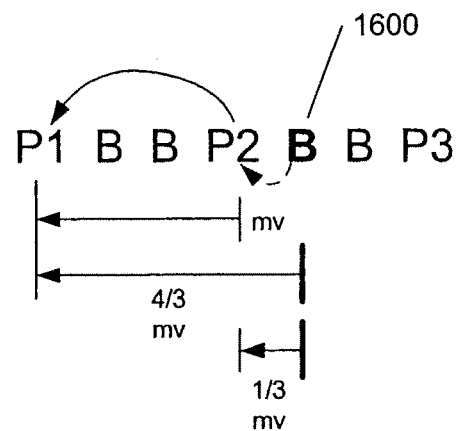
FIG. 16 is a diagram showing a sequence of P and B frames in which a nearest previous P frame has a motion vector referencing a prior P frame.

Direct mode coding of B frames in MPEG-4 always uses the subsequent P frame's motion vectors as a reference. In accordance with another aspect of the invention, it is also possible for a B frame to reference the motion vectors of the previous P frame's co-located macroblocks, which will sometimes prove a beneficial choice of direct mode coding reference. In this case, the motion vector frame scale fractions will be greater than one, when the next nearest previous P frame is referenced by the nearest previous frame's P motion vector. FIG. 16 is a diagram showing a sequence of P and B frames in which a nearest previous P frame has a motion vector referencing a prior P frame. In this example, a B frame 1600 references the 1-away previous P frame P2. The motion vector mv of frame P2 references the next previous P frame P1 (2-away relative to the B frame 1600). The appropriate frame scale fractions are shown.

Figure 17:
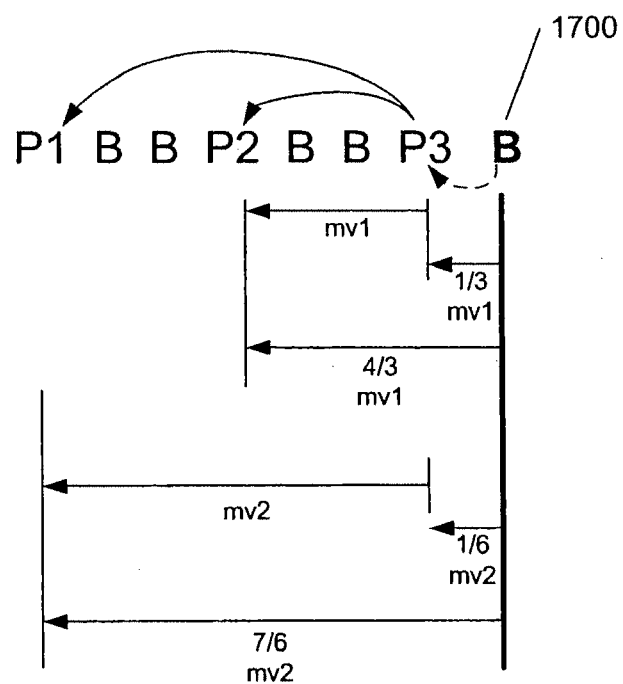
FIG. 17 is a diagram showing a sequence of P and B frames in which a nearest previous P frame has two motion vectors referencing prior P frames.

If the nearest previous P frame is interpolated from multiple vectors and frames, then methods similar to those described in conjunction with FIG. 14 apply to obtain the motion vector frame scale fractions and interpolation weights. FIG. 17 is a diagram showing a sequence of P and B frames in which a nearest previous P frame has two motion vectors referencing prior P frames. In this example, a B frame 1700 references the previous P frame P3. One motion vector mv1 of the previous P3 frame references the next previous P frame P2, while the second motion vector mv2 references the 2-away previous P frame P1. The appropriate frame scale fractions are shown.

Each macroblock for the B frame 1700 would be constructed as a blend from:
  corresponding pixels of frame P3 displaced by the frame scale fraction $1/3$ of mv1 (where the pixels may then be multiplied by some proportional weight i) plus corresponding pixels of frame P2 displaced by the frame scale fraction $4/3$ of mv1 (where the pixels may then be multiplied by some proportional weight j); and
  corresponding pixels of frame P3 displaced by the frame scale fraction $1/6$ of mv2 (where the pixels may then be multiplied by some proportional weight k) plus corresponding pixels of frame P1 displaced by the frame scale fraction $7/6$ of mv2 (where the pixels may then be multiplied by some proportional weight l).

Figure 18:
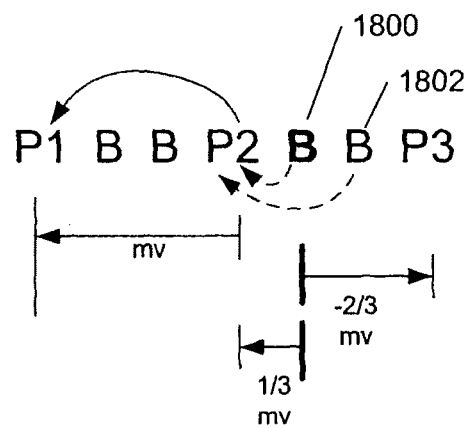
FIG. 18 is a diagram showing a sequence of P and B frames in which a nearest previous P frame has a motion vector referencing a prior P frame.

When the motion vector of a previous P frame (relative to a B frame) points to the next nearest previous P frame, it is not necessary to only utilize the next nearest previous frame as the interpolation reference, as in FIG. 16. The nearest previous P frame may prove a better choice for motion compensation. In this case, the motion vector of the nearest previous P frame is shortened to the frame distance fraction from a B frame to that P frame. FIG. 18 is a diagram showing a sequence of P and B frames in which a nearest previous P frame has a motion vector referencing a prior P frame. In this example, for M=3, a first B frame 1800 would use $1/3$ and $-2/3$ frame distance fractions times the motion vector mv of the nearest previous P frame P2. The second B frame 1802 would use $2/3$ and $-1/3$ frame distance fractions (not shown). Such a selection would be signaled to the decoder to distinguish this case from the case shown in FIG. 16.

As with all other coding modes, the use of direct mode preferably involves testing the candidate mode against other available interpolation and single-vector coding modes and reference frames. For direct mode testing, the nearest subsequent P frame (and, optionally, the next nearest subsequent P frame or even more distant subsequent P frames, and/or one or more previous P frames) can be tested as candidates, and a small number of bits (typically one or two) can be used to specify the direct mode P reference frame distance(s) to be used by a decoder.

Extended Interpolation Values

It is specified in MPEG-1, 2, and 4, as well as in the H.261 and H.263 standards, that B frames use an equal weighting of pixel values of the forward referenced and backward referenced frames, as displaced by the motion vectors. Another aspect of this invention includes application of various useful unequal weightings that can significantly improve B frame coding efficiency, as well as the extension of such unequal weightings to more than two references, including two or more references backward or forward in time. This aspect of the invention also includes methods for more than one frame being referenced and interpolated for P frames. Further, when two or more references point forward in time, or when two or more references point backward in time, it will sometimes be useful to use negative weightings as well as weightings in excess of 1.0.

Figure 19:
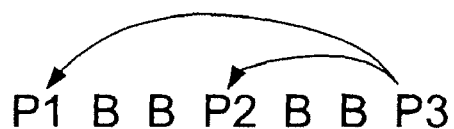
FIG. 19 is a frame sequence showing the case of three P frames P1, P2, and P3, where P3 uses an interpolated reference with two motion vectors, one for each of P1 and P2.

For example, FIG. 19 is a frame sequence showing the case of three P frames P1, P2, and P3, where P3 uses an interpolated reference with two motion vectors, one for each of P1 and P2. If, for example, a continuous change is occurring over the span of frames between P1 and P3, then P2−P1 (i.e., the pixel values of frame P2, displaced by the motion vector for P2, minus the pixel values of frame P1, displaced by the motion vector for P1) will equal P3−P2. Similarly, P3−P1 will be double the magnitude of P2−P1 and P3−P2. In such a case, the pixel values for frame P3 can be predicted differentially from P1 and P2 through the formula:

$$P3=P1+2\times(P2-P1)=(2\times P2)-P1$$

In this case, the interpolative weights for P3 are 2.0 for P2, and −1.0 for P1.

Figure 20:
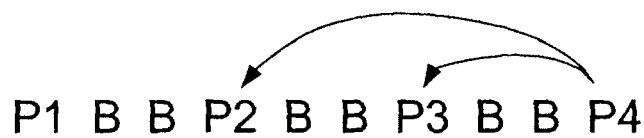
FIG. 20 is a frame sequence showing the case of four P frames P1, P2, P3, and P4, where P4 uses an interpolated reference with three motion vectors, one for each of P1, P2, and P3.

As another example, FIG. 20 is a frame sequence showing the case of four P frames P1, P2, P3, and P4, where P4 uses an interpolated reference with three motion vectors, one for each of P1, P2, and P3. Thus, since P4 is predicted from P3, P2, and P1, three motion vectors and interpolative weights would apply. If, in this case, a continuous change were occurring over this span of frames, then P2−P1 would equal both P3−P2 and P4−P3, and P4−P1 would equal both 3×(P2−P1) and 3×(P3−P2).

Thus, in this example case, a prediction of P4 based upon P2 and P1 would be:

$$P4=P1+3\times(P2-P1)=(3\times P2)-(2\times P1)\text{(weights 3.0 and }-2.0)$$

The prediction of P4 based upon P3 and P1 would be:

$$P4=P1+\tfrac{3}{2}\times(P3-P1)=(\tfrac{3}{2}\times P3)-(\tfrac{1}{2}\times P1)\text{(weights 1.5 and }-0.5)$$

The prediction of P4 based upon P3 and P2 would be:

$$P4=P2+2\times(P3-P2)=(2\times P3)-P2 \text{ (weights 2.0 and }-1.0)$$

However, it might also be likely that the change most near to P4, involving P3 and P2, is a more reliable predictor of P4 than predictions involving P1. Thus, by giving ¼ weight to each of the two terms above involving P1, and ½ weight to the term involving only P3 and P2, would result in:

$$\tfrac{1}{2}(2P3-P2)+\tfrac{1}{4}(\tfrac{3}{2}P3-\tfrac{1}{2}P1)+\tfrac{1}{4}(3P2-2P1)=1\tfrac{3}{8}P3+\tfrac{1}{4}P2-\tfrac{5}{8}P1\text{(weights 1.375, 0.25, and }-0.625)$$

Accordingly, it will sometimes be useful to use weights both above 1.0 and below zero. At other times, if there is noise-like variation from one frame to the next, a positive weighted average having mild coefficients between 0.0 and 1.0 might yield the best predictor of P4's macroblock (or other region of pixels). For example, an equal weighting of ⅓ of each of P1, P2, and P3 in FIG. 20 might form the best predictor of P4 in some cases.

Note that the motion vector of the best match is applied to determine the region of P1, P2, P3, etc., being utilized by the computations in this example. This match might best be an AC match in some cases, allowing a varying DC term to be predicted through the AC coefficients. Alternatively, if a DC match (such as Sum of Absolute Difference) is used, then changes in AC coefficients can often be predicted. In other cases, various forms of motion vector match will form a best prediction with various weighting blends. In general, the best predictor for a particular case is empirically determined using the methods described herein.

These techniques are also applicable to B frames that have two or more motion vectors pointing either backward or forward in time. When pointing forward in time, the coefficient pattern described above for P frames is reversed to accurately predict backward to the current P frame. It is possible to have two or more motion vectors in both the forward and backward direction using this aspect of the invention, thereby predicting in both directions concurrently. A suitable weighted blend of these various predictions can be optimized by selecting the blend weighting which best predicts the macroblock (or other pixel region) of a current B frame.

Figure 21:
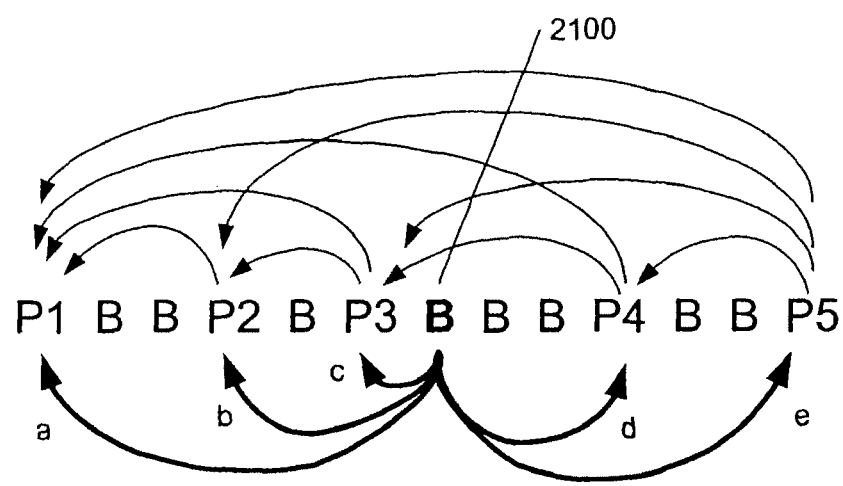
FIG. 21 is a diagram showing a sequence of P and B frames in which various P frames have one or more motion vectors referencing various previous P frames, and showing different weights assigned to respective forward and backward references by a particular B frame.

FIG. 21 is a diagram showing a sequence of P and B frames in which various P frames have one or more motion vectors referencing various previous P frames, and showing different weights a-e assigned to respective forward and backward references by a particular B frame. In this example, a B frame 2100 references three previous P frames and two subsequent P frames.

Figure 22:
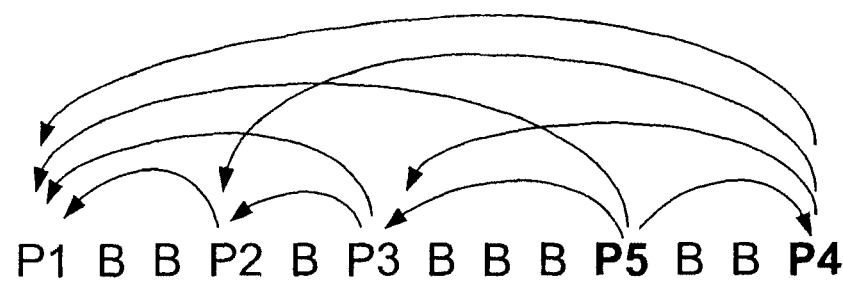
FIG. 22 is a diagram showing a sequence of P and B frames in which the bitstream order of the P frames differs from the display order.

In the example illustrated in FIG. 21, frame P5 must be decoded for this example to work. It is useful sometimes to order frames in a bitstream in the order needed for decoding ("delivery order"), which is not necessarily the order of display ("display order"). For example, in a frame sequence showing cyclic motion (e.g., rotation of an object), a particular P frame may be more similar to a distant P frame than to the nearest subsequent P frame. FIG. 22 is a diagram showing a sequence of P and B frames in which the bitstream delivery order of the P frames differs from the display order. In this example, frame P3 is more similar to frame P5 than to frame P4. It is therefore useful to deliver and decode P5 before P4, but display P4 before P5. Preferably, each P frame should signal to the decoder when such P frame can be discarded (e.g., an expiration of n frames in bitstream order, or after frame X in the display order).

If the weightings are selected from a small set of choices, then a small number of bits can signal to the decoder which weighting is to be used. As with all other weightings described herein, this can be signaled to a decoder once per image unit, or at any other point in the decoding process where a change in weightings is useful.

It is also possible to download new weighting sets. In this way, a small number of weighting sets may be active at a given time. This allows a small number of bits to signal a decoder which of the active weighting sets is to be used at any given point in the decoding process. To determine suitable weighting sets, a large number of weightings can be tested during encoding. If a small subset is found to provide high efficiency, then that subset can be signaled to a decoder for use. A particular element of the subset can thus be signaled to the decoder with just a few bits. For example, 10 bits can select 1 of 1024 subset elements. Further, when a particular small subset should be changed to maintain efficiency, a new subset can be signaled to the decoder. Thus, an encoder can dynamically optimize the number of bits required to select among weighting set elements versus the number of bits needed to update the weighting sets. Further, a small number of short codes can be used to signal common useful weightings, such as ½, ⅓, ¼, etc. In this way, a small number of bits can be used to signal the set of weightings, such as for a K-forward-vector prediction in a P frame (where K=1, 2, 3, . . . ), or a K-forward-vector and L-backward-vector prediction in a B frame (where K and L are selected from 0, 1, 2, 3, . . . ), or a K-forward-vector and L-backward-vector prediction in a P frame (where K and L are selected from 0, 1, 2, 3, . . . ), as a function of the current M value (i.e., the relative position of the B frame with respect to the neighboring P (or I) frames).

Figure 23:
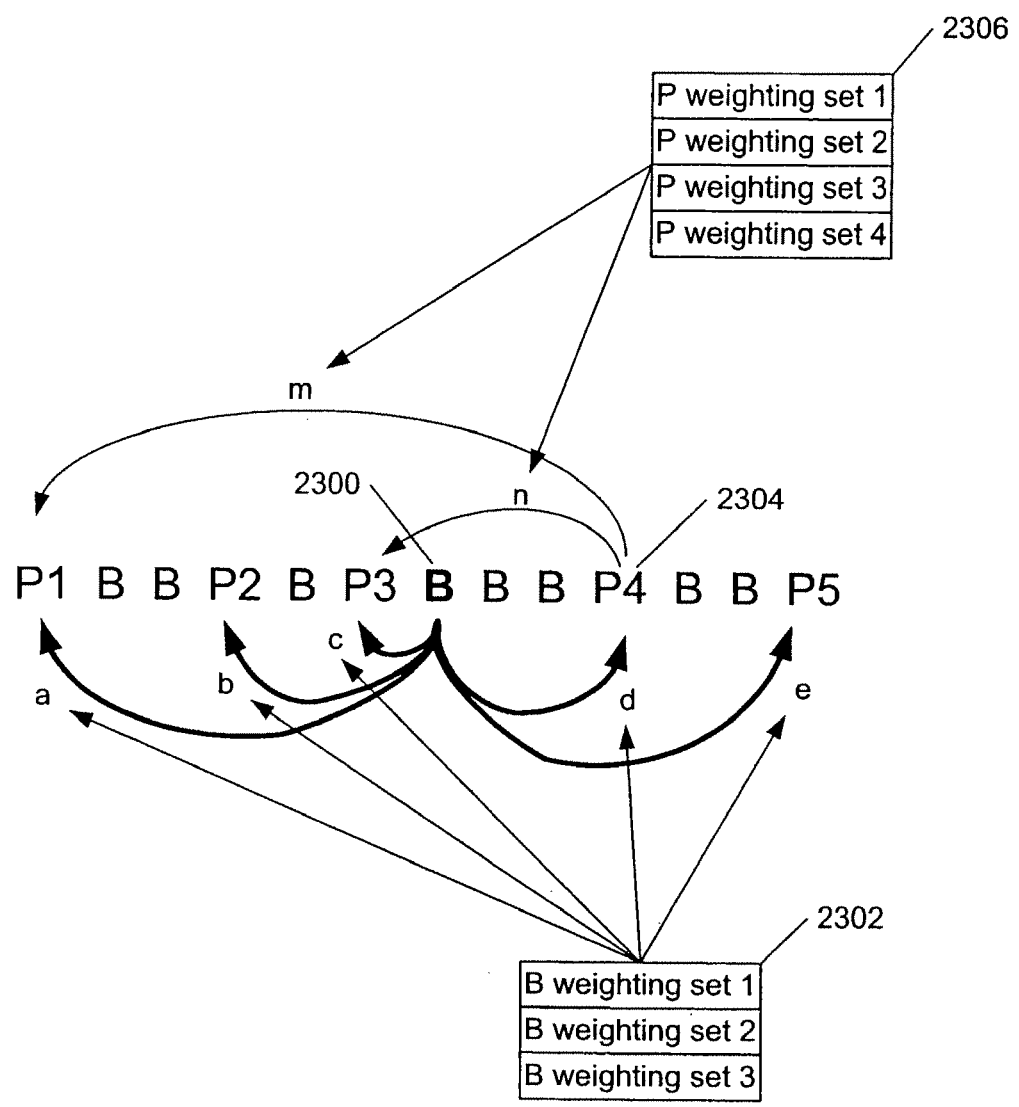
FIG. 23 is a diagram showing a sequence of P and B frames with assigned weightings.

FIG. 23 is a diagram showing a sequence of P and B frames with assigned weightings. A B frame 2300 has weights a-e, the values of which are assigned from a table of B frame weighting sets 2302. A P frame 2304 has weights m, n, the values of which are assigned from a table of P frame weighting sets 2306. Some weightings can be static (i.e., permanently downloaded to the decoder), and signaled by an encoder. Other weightings may be dynamically downloaded and then signaled.

This same technique may be used to dynamically update weighting sets to select DC interpolation versus AC interpolation. Further, code values can be signaled which select normal (linear) interpolation (of pixel values normally represented in a non-linear representation) versus linear interpolation of converted values (in an alternate linear or non-linear representation). Similarly, such code values can signal which such interpolation to apply to AC or DC values or whether to split AC and DC portions of the prediction.

Active subsetting can also be used to minimize the number of bits necessary to select between the sets of weighting coefficients currently in use. For example, if 1024 downloaded weighting sets were held in a decoder, perhaps 16 might need to be active during one particular portion of a frame. Thus, by selecting which subset of 16 (out of 1024)

weighting sets are to be active, only 4 bits need be used to select which weighting set of these 16 is active. The subsets can also be signaled using short codes for the most common subsets, thus allowing a small number of bits to select among commonly used subsets.

Softening and Sharpening

As with the simple separation of a DC component from AC signals via subtraction of the average value, other filtering operations are also possible during motion vector compensated prediction. For example, various high-pass, band-pass, and low-pass filters can be applied to a pixel region (such as a macroblock) to extract various frequency bands. These frequency bands can then be modified when performing motion compensation. For example, it often might be useful on a noisy moving image to filter out the highest frequencies in order to soften (make less sharp, or blur slightly) the image. The softer image pixels, combined with a steeper tilt matrix for quantization (a steeper tilt matrix ignores more high-frequency noise in the current block), will usually form a more efficient coding method. It is already possible to signal a change in the quantization tilt matrix for every image unit. It is also possible to download custom tilt matrices for luminance and chroma. Note that the effectiveness of motion compensation can be improved whether the tilt matrix is changed or not. However, it will often be most effective to change both the tilt matrix and filter parameters which are applied during motion compensation.

It is common practice to use reduced resolution for chroma coding together with a chroma specific tilt matrix. However, the resolution of chroma coding is static in this case (such as 4:2:0 coding half resolution vertically and horizontally, or 4:2:2 coding half resolution only horizontally). Coding effectiveness can be increased in accordance with this aspect of the invention by applying a dynamic filter process during motion compensation to both chroma and luminance (independently or in tandem), selected per image unit.

U.S. patent application Ser. No. 09/545,233, entitled "Enhanced Temporal and Resolution Layering in Advanced Television" (referenced above), describes the use of improved displacement filters having negative lobes (a truncated sinc function). These filters have the advantage that they preserve sharpness when performing the fractional-pixel portion of motion vector displacement. At both the integer pixel displacement point and at the fractional points, some macroblocks (or other useful image regions) are more optimally displaced using filters which reduce or increase their sharpness. For example, for a "rack focus" (where some objects in the frame are going out of focus over time, and others portions of the frame are coming into focus), the transition is one of change both in sharpness and in softness. Thus, a motion compensation filter that can both increase sharpness at certain regions in an image while decreasing sharpness in other regions can improve coding efficiency. In particular, if a region of a picture is going out of focus, it may be beneficial to decrease sharpness, which will soften the image (thereby potentially creating a better match) and decrease grain and/or noise (thereby possibly improving coding efficiency). If a region of the image is coming into focus, it may be beneficial to preserve maximum sharpness, or even increase sharpness using larger negative lobe filter values.

Chroma filtering can also benefit from sharpness increase and decrease during coding. For example, much of the coding efficiency benefits of 4:2:0 coding (half resolution chroma horizontally and vertically) can be achieved by using softer motion compensation filters for chroma while preserving full resolution in the U and/or V channels. Only when color detail in the U and V channels is high will it be necessary to select the sharpest displacement filters; softer filters will be more beneficial where there is high color noise or grain.

In addition to changes in focus, it is also common to have the direction and amount of motion blur change from one frame to the next. At the motion picture film frame rate of 24 fps, even a simple dialog scene can have significant changes in motion blur from one frame to the next. For example, an upper lip might blur in one frame, and sharpen in the next, entirely due to the motion of the lip during the open shutter time in the camera. For such motion blur, it will be beneficial not only to have sharpening and softening (blurring) filters during motion compensation, but also to have a directional aspect to the sharpening and softening. For example, if a direction of motion can be determined, a softening or sharpening along that direction can be used to correspond to the moving or stopping of an image feature. The motion vectors used for motion compensation can themselves provide some useful information about the amount of motion, and the change in the amount of motion (i.e., motion blur), for a particular frame (or region within a frame) with respect to any of the surrounding frames (or corresponding regions). In particular, a motion vector is the best movement match between P frames, while motion blur results from movement during the open shutter time within a frame.

Figure 24:
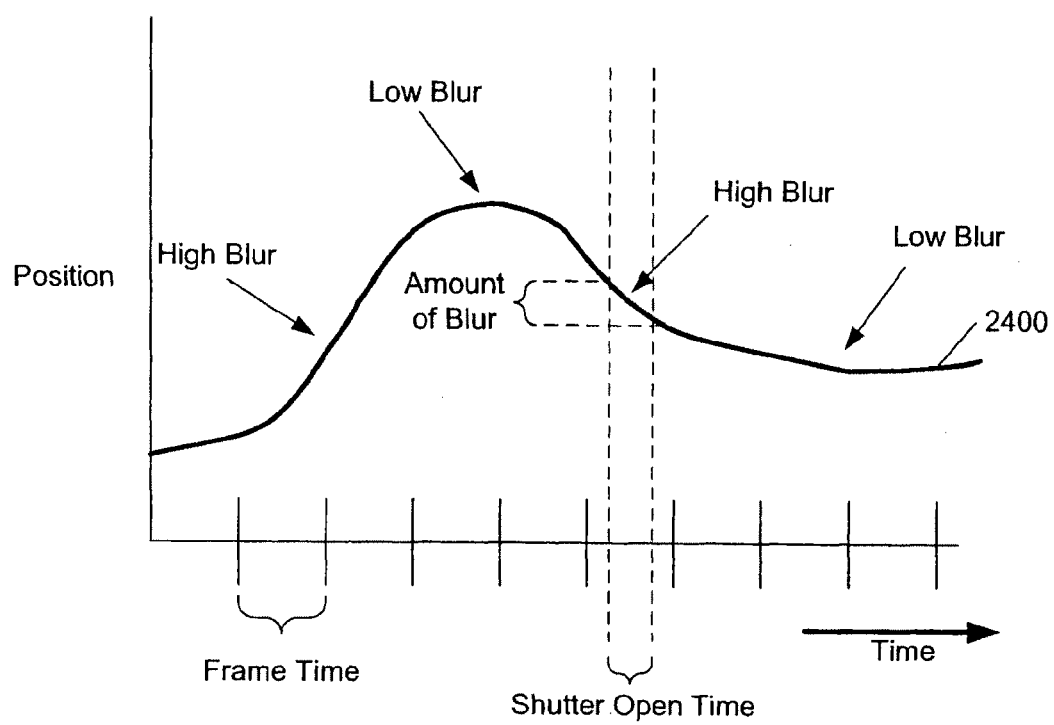
FIG. 24 is a graph of position of an object within a frame versus time.

FIG. 24 is a graph of position of an object within a frame versus time. The shutter of a camera is open only during part of a frame time. Any motion of the object while the shutter is open results in blur. The amount of motion blur is indicated by the amount of position change during the shutter open time. Thus, the slope of the position curve 2400 while the shutter is open is a measurement of motion blur.

The amount of motion blur and the direction of motion can also be determined from a combination of sharpness metrics, surrounding motion vectors (where image regions match), feature smear detection, and human assisted designation of frame regions. A filter can be selected based on the determined amount of motion blur and motion direction. For example, a mapping of various filters versus determined motion blur and direction can be empirically determined.

When combined with the other aspects of this invention, such intelligently applied filters can significantly improve compression coding efficiency. A small number of such filters can be selected with a small number of bits signaled to the decoder. Again, this can be done once per image unit or at other useful points in the decoding process. As with weighting sets, a dynamically loaded set of filters can be used, as well as an active subsetting mechanism, to minimize the number of bits needed to select between the most beneficial set of filter parameters.

Implementation

The invention may be implemented in hardware or software, or a combination of both (e.g., programmable logic arrays). Unless otherwise specified, the algorithms included as part of the invention are not inherently related to any particular computer or other apparatus. In particular, various general purpose machines may be used with programs written in accordance with the teachings herein, or it may be more convenient to construct more specialized apparatus (e.g., integrated circuits) to perform particular functions. Thus, the invention may be implemented in one or more computer programs executing on one or more programmable computer systems each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such program may be implemented in any desired computer language (including machine, assembly, or high level procedural, logical, or object oriented programming languages) to communicate with a computer system. In any case, the language may be a compiled or interpreted language.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described. Accordingly, other embodiments are within the scope of the following claims.

What is claimed is:

1. An apparatus comprising a video bitstream stored on non-transitory machine-readable media, the bitstream characterized by:
    picture frames comprising picture regions in a compressed format, wherein the compressed format for at least one picture region within a picture frame comprises:
    a signal indicating a size of a picture region of the at least one picture region comprises 16×16 pixels;
    one or more signals indicating the picture region being subdivided into at least three sub-regions; and
    one or more signals indicating (i) a first interpolation mode used for determining pixel values for a first sub-region of the at least three sub-regions and (ii) a second interpolation mode used for determining pixel values for a second sub-region of the at least three sub-regions, wherein the first interpolation method is different from the second interpolation method,
    wherein each of the at least three sub-regions is adjacent to at least one of the other sub-regions,
    wherein the at least three sub-regions comprise an 8×8 pixel sub-region, and
    wherein the compressed format includes at least one motion vector for each of the at least three sub-regions.

2. The apparatus of claim 1, further comprising a signal indicating the picture region is a P-region.

3. The apparatus of claim 1, further comprising a signal indicating the picture region is a B-region.

4. The apparatus of claim 1, wherein the at least three sub-regions vary in block sizes.

* * * * *

UNITED STATES PATENT AND TRADEMARK OFFICE
CERTIFICATE OF CORRECTION

PATENT NO. : 9,571,855 B2
APPLICATION NO. : 15/190097
DATED : February 14, 2017
INVENTOR(S) : Gary A. Demos It is certified that error appears in the above-identified patent and that said Letters Patent is hereby corrected as shown below:

On the Title Page

Item (63), Delete the paragraph under the heading "Related U.S. Application Data" (said paragraph spanning pages 1 and 2), and insert therefor:
-- This application is a continuation of, and claims the benefit of priority to U.S. Patent Application Serial No. 14/856,691, filed September 17, 2015, now U.S. Patent No. 9,473,791, and is also a continuation of, and claims the benefit of priority to U.S. Patent Application Serial No. 14/856,791 filed September 17, 2015, now U.S. Pat. No. 9,386,321. U.S. Patent Application Serial No. 14/856,691 is a continuation of, and claims the benefit of priority to U.S. Patent Application Serial No. 14/729,572 filed June 3, 2015, now U.S. Patent No. 9,232,232, and is also a continuation of, and claims the benefit of priority to U.S. Patent Application Serial No. 14/729,628, filed June 3, 2015, now U.S. Patent No. 9,247,269. U.S. Patent Application Serial No. 14/856,791 is a continuation of, and claims the benefit of priority to U.S. Patent Application Serial No. 14/729,572 filed June 3, 2015, now U.S. Patent No. 9,232,232, and is also a continuation of, and claims the benefit of priority to U.S. Patent Application Serial No. 14/729,628, filed June 3, 2015, now U.S. Patent No. 9,247,269. U.S. Patent Application Serial No. 14/729,572 is a continuation of, and claims the benefit of priority to U.S. Patent Application Serial No. 14/565,803, filed December 10, 2014, now U.S. Patent No. 9,083,979, and is also a continuation of, and claims the benefit of priority to U.S. Patent Application Serial No. 14/565,824, filed December 10, 2014, now U.S. Patent No. 9,078,002. U.S. Patent Application Serial No. 14/729,628 is a continuation of, and claims priority to U.S. Patent Application Serial No. 14/565,803, filed December 10, 2014, now U.S. Patent No. 9,083,979, and is also a continuation of, and claims the benefit of priority to U.S. Patent Application Serial No. 14/565,824, filed December 10, 2014, now U.S. Patent No. 9,078,002. U.S. Patent Application Serial No. 14/565,803 is a continuation of, and claims the benefit of priority to U.S. Patent Application Serial No. 13/915,056, filed June 11, 2013, now U.S. Patent No. 8,942,285. U.S. Patent Application Serial No. 14/565,824 is a continuation of, and claims the benefit of priority to U.S. Patent Application Serial No. 13/915,056, filed June 11, 2013, now U.S. Patent No. 8,942,285. U.S. Patent Application Serial No. 13/915,056 is a continuation of U.S. Patent Application Serial No. 13/859,373, filed April 9, 2013, now U.S. Patent No. 8,767,829, which is a continuation of U.S. Patent Application Serial No. 13/675,622, filed November 13, 2012, now U.S. Patent No. 8,503,529, which is a continuation of U.S. Patent Application Serial No.

Signed and Sealed this
Fourteenth Day of April, 2020

Andrei Iancu
*Director of the United States Patent and Trademark Office*

CERTIFICATE OF CORRECTION (continued)
U.S. Pat. No. 9,571,855 B2

12/986,220, filed January 7, 2011, now U.S. Patent No. 8,401,078, which is a continuation of U.S. Patent Application Serial No. 12/644,953, filed December 22, 2009, now U.S. Patent No. 8,477,851, which is a continuation of U.S. Patent Application Serial No. 12/567,161, filed September 25, 2009, now U.S. Patent No. 8,050,323, which is a continuation of U.S. Patent Application Serial No. 11/831,723, filed July 31, 2007, now U.S. Patent No. 7,894,524, and which is a divisional application of U.S. Patent Application Serial No. 10/187,395, filed on June 28, 2002, now U.S. Patent No. 7,266,150. U.S. Patent Application Serial No. 10/187,395 is a continuation-in-part of U.S. Patent Application Serial No. 09/904,203, filed on July 11, 2001, now U.S. Patent No. 6,816,552. --

In the Specification

Column 1, Line 6, under "Cross-Reference to Related Applications", please delete the entire paragraph and insert therefor:
-- This application is a continuation of, and claims the benefit of priority to U.S. Patent Application Serial No. 14/856,691, filed September 17, 2015, now U.S. Patent No. 9,473,791, and is also a continuation of, and claims the benefit of priority to U.S. Patent Application Serial No. 14/856,791 filed September 17, 2015, now U.S. Pat. No. 9,386,321. U.S. Patent Application Serial No. 14/856,691 is a continuation of, and claims the benefit of priority to U.S. Patent Application Serial No. 14/729,572 filed June 3, 2015, now U.S. Patent No. 9,232,232, and is also a continuation of, and claims the benefit of priority to U.S. Patent Application Serial No. 14/729,628, filed June 3, 2015, now U.S. Patent No. 9,247,269. U.S. Patent Application Serial No. 14/856,791 is a continuation of, and claims the benefit of priority to U.S. Patent Application Serial No. 14/729,572 filed June 3, 2015, now U.S. Patent No. 9,232,232, and is also a continuation of, and claims the benefit of priority to U.S. Patent Application Serial No. 14/729,628, filed June 3, 2015, now U.S. Patent No. 9,247,269. U.S. Patent Application Serial No. 14/729,572 is a continuation of, and claims the benefit of priority to U.S. Patent Application Serial No. 14/565,803, filed December 10, 2014, now U.S. Patent No. 9,083,979, and is also a continuation of, and claims the benefit of priority to U.S. Patent Application Serial No. 14/565,824, filed December 10, 2014, now U.S. Patent No. 9,078,002. U.S. Patent Application Serial No. 14/729,628 is a continuation of, and claims priority to U.S. Patent Application Serial No. 14/565,803, filed December 10, 2014, now U.S. Patent No. 9,083,979, and is also a continuation of, and claims the benefit of priority to U.S. Patent Application Serial No. 14/565,824, filed December 10, 2014, now U.S. Patent No. 9,078,002. U.S. Patent Application Serial No. 14/565,803 is a continuation of, and claims the benefit of priority to U.S. Patent Application Serial No. 13/915,056, filed June 11, 2013, now U.S. Patent No. 8,942,285. U.S. Patent Application Serial No. 14/565,824 is a continuation of, and claims the benefit of priority to U.S. Patent Application Serial No. 13/915,056, filed June 11, 2013, now U.S. Patent No. 8,942,285. U.S. Patent Application Serial No. 13/915,056 is a continuation of U.S. Patent Application Serial No. 13/859,373, filed April 9, 2013, now U.S. Patent No. 8,767,829, which is a continuation of U.S. Patent Application Serial No. 13/675,622, filed November 13, 2012, now U.S. Patent No. 8,503,529, which is a continuation of U.S. Patent Application Serial No. 12/986,220, filed January 7, 2011, now U.S. Patent No. 8,401,078, which is a continuation of U.S. Patent Application Serial No. 12/644,953, filed December 22, 2009, now U.S. Patent No. 8,477,851, which is a continuation of U.S. Patent Application Serial No. 12/567,161, filed September 25, 2009, now U.S. Patent No. 8,050,323, which is a continuation of U.S. Patent Application Serial No. 11/831,723, filed July 31, 2007, now U.S. Patent No. 7,894,524, and which is a divisional application of U.S. Patent Application Serial No. 10/187,395, filed on June 28, 2002, now U.S. Patent No.

7,266,150. U.S. Patent Application Serial No. 10/187,395 is a continuation-in-part of U.S. Patent Application Serial No. 09/904,203, filed on July 11, 2001, now U.S. Patent No. 6,816,552. --